US012569793B2

(12) United States Patent　　　　(10) Patent No.:　US 12,569,793 B2

Schwartz　　　　　　　　　　　　(45) Date of Patent:　　Mar. 10, 2026

(54) FILTER ASSEMBLIES WITH ALIGNMENT FEATURES

(71) Applicant: CUMMINS FILTRATION INC., Nashville, TN (US)

(72) Inventor: Scott W. Schwartz, Cottage Grove, WI (US)

(73) Assignee: CUMMINS FILTRATION INC., Nashville, TN (US)

( * ) Notice: Subject to any disclaimer, the term of this patent is extended or adjusted under 35 U.S.C. 154(b) by 322 days.

(21) Appl. No.: 18/033,634

(22) PCT Filed: Oct. 28, 2021

(86) PCT No.: PCT/US2021/057041

§ 371 (c)(1),
(2) Date: Apr. 25, 2023

(87) PCT Pub. No.: WO2022/094074

PCT Pub. Date: May 5, 2022

(65) Prior Publication Data

US 2023/0398480 A1　　Dec. 14, 2023

Related U.S. Application Data

(60) Provisional application No. 63/108,568, filed on Nov. 2, 2020.

(51) Int. Cl.
*B01D 46/00* (2022.01)

(52) U.S. Cl.
CPC ..... *B01D 46/0004* (2013.01); *B01D 46/0005* (2013.01); *B01D 2265/026* (2013.01); *B01D 2271/022* (2013.01)

(58) Field of Classification Search
CPC ........ B01D 2265/026; B01D 2265/028; B01D 2271/022; B01D 46/0002; B01D 46/0004;
(Continued)

(56) References Cited

U.S. PATENT DOCUMENTS 5,569,311 A * 10/1996 Oda ....................... B01D 46/10
55/502
5,613,237 A 3/1997 Bent et al.
(Continued)

FOREIGN PATENT DOCUMENTS

DE　102014009026 A1 * 1/2015 ........... B01D 46/001
DE　10 2015 003 297 A1　9/2016
DE　102023105071 A1 * 9/2024 ......... B01D 46/0004

OTHER PUBLICATIONS

Supplemental Partial Search Report issued for European Patent Application No. 21887515.1 issued Jul. 2, 2024, 12 pages.
(Continued)

*Primary Examiner* — Robert Clemente
(74) *Attorney, Agent, or Firm* — Benesch Friedlander Coplan & Aronoff LLP

(57) ABSTRACT

A filter assembly comprises a filter element and a housing assembly. The filter element comprises a filter media and a frame. The housing assembly contains the filter media and comprises a housing base and a housing cover. The housing base comprises a base end portion, and the housing cover comprises a housing end portion. The frame is secured to and surrounds at least an outer perimeter of the filter media. The frame is positionable axially between and attachable to the housing base and the housing cover such that the frame engages with the base end portion and the cover end portion, and a seal is formed between the frame and at least one of the housing base and the housing cover.

15 Claims, 19 Drawing Sheets

(58) Field of Classification Search
CPC ............... B01D 46/0005; B01D 46/10; B01D
46/525–527; B01D 46/009; F02M
35/02416; F02M 35/02475; F02M
35/02491
See application file for complete search history.

(56) References Cited

U.S. PATENT DOCUMENTS

| | | | |
|---|---|---|---|
| 5,725,624 A * | 3/1998 | Ernst .................. | B01D 46/0005 |
| | | | 55/497 |
| 6,190,432 B1 | 2/2001 | Gieseke et al. | |
| 7,247,183 B2 | 7/2007 | Connor et al. | |
| 8,034,145 B2 | 10/2011 | Boehrs et al. | |
| 8,163,057 B2 | 4/2012 | Blossey et al. | |
| 8,409,316 B2 | 4/2013 | Nelson et al. | |
| 8,496,723 B2 | 7/2013 | Reichter et al. | |
| 8,545,585 B2 | 10/2013 | Raether | |
| 9,359,982 B2 | 6/2016 | Oh | |
| 10,150,074 B2 | 12/2018 | Hegner et al. | |
| 2006/0021932 A1 | 2/2006 | Darnell et al. | |
| 2007/0045167 A1 | 3/2007 | Jaroszczyk et al. | |
| 2008/0016832 A1* | 1/2008 | Krisko .............. | B01D 46/4227 |
| | | | 55/342 |
| 2010/0000190 A1* | 1/2010 | Kidman .............. | B01D 46/521 |
| | | | 55/504 |
| 2010/0043367 A1* | 2/2010 | Desjardins ......... | F02M 35/0203 |
| | | | 55/493 |
| 2010/0107580 A1 | 5/2010 | Thienel | |
| 2010/0258493 A1* | 10/2010 | Kindkeppel .......... | B01D 46/10 |
| | | | 210/450 |
| 2013/0199143 A1 | 8/2013 | Zou et al. | |
| 2013/0305930 A1* | 11/2013 | Oh ................... | F02M 35/02425 |
| | | | 96/385 |
| 2014/0318090 A1* | 10/2014 | Rieger ................... | B01D 46/10 |
| | | | 55/495 |
| 2014/0318092 A1* | 10/2014 | Rieger .............. | B01D 46/0005 |
| | | | 55/511 |
| 2015/0013288 A1 | 1/2015 | Hasenfratz et al. | |
| 2016/0243484 A1* | 8/2016 | Endo ................. | B01D 46/0004 |
| 2017/0296949 A1* | 10/2017 | Krull ..................... | B01D 45/16 |
| 2018/0257017 A1 | 9/2018 | Adamek et al. | |
| 2018/0345196 A1 | 12/2018 | Campbell et al. | |
| 2018/0361295 A1 | 12/2018 | Legare et al. | |
| 2019/0111374 A1 | 4/2019 | Burton et al. | |
| 2019/0224608 A1* | 7/2019 | Neef .................... | B01D 46/521 |
| 2020/0269168 A1* | 8/2020 | Krull .................... | B01D 35/30 |
| 2021/0129067 A1* | 5/2021 | Knight .................. | B01D 46/10 |
| 2023/0321579 A1* | 10/2023 | Kang ................. | B01D 46/0004 |
| | | | 210/348 |

OTHER PUBLICATIONS

International Search Report and Written Opinion issued for PCT Application No. PCT/US2021/057041, issued Jan. 31, 2022, 16 pages.

* cited by examiner

190

FILTER ASSEMBLIES WITH ALIGNMENT FEATURES

CROSS-REFERENCE TO RELATED APPLICATIONS

The present application is a national phase of PCT Application No. PCT/US2021/057041, filed Oct. 28, 2021, which claims priority to and the benefit of U.S. Provisional Patent Application No. 63/108,568, filed Nov. 2, 2020. The contents of these applications are hereby incorporated herein by reference in their entireties.

FIELD

The present application relates generally to filter assemblies for air intake systems or the like.

BACKGROUND

In hot, under-hood applications, various conventional polymer housings 190 (as shown in FIG. 1) are used extensively in air filter assemblies. In-line flow filters require large face flow areas to minimize restriction. However, these large, open polymer housings 190 have a tendency to warp, which causes servicing the air filter assembly to be difficult and prevents the sealing interface of the housing 190 from aligning (causing leakage).

SUMMARY

Various embodiments provide for a filter assembly comprising a filter element comprising a filter media and a frame and a housing assembly containing the filter media. The housing assembly comprises a housing base and a housing cover. The housing base comprises a base end portion, and the housing cover comprises a housing end portion. The frame is secured to and surrounding at least an outer perimeter of the filter media. The frame is axially positionable between and attachable to the housing base and the housing cover such that the frame engages with the base end portion and the cover end portion and a seal is formed between the frame and at least one of the housing base and the housing cover.

Various embodiments provide for a filter element comprising a filter media and a frame secured to and surrounding at least an outer perimeter of the filter media. The frame is positionable axially between and attachable to a housing base and a housing cover of a housing assembly such that the frame engages with a base end portion of the housing base and a cover end portion of the housing cover, the filter media is contained within the housing assembly, and a seal is formed between the frame and at least one of the housing base and the housing cover.

Various embodiments provide for a filter assembly comprising a filter element comprising a filter media and a frame and a housing assembly containing the filter media. The frame is secured to and surrounding at least an outer perimeter of the filter media. The housing assembly comprises a housing base, a housing cover, a fastener, and a fastener supporting component. The housing base comprises a base end portion, and the housing cover comprises a housing end portion. The fastener supporting component is coupled to the at least one of the housing base and the housing cover. The frame is axially positionable between and attachable to the housing base and the housing cover.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a filter assembly comprising a filter element and a housing assembly. The filter element comprises a filter media and a frame. The configuration of the frame and the housing assembly ensures that the filter element and the housing assembly are aligned and sealed to prevent leakage and to prevent the filter assembly from warping. The frame is positioned and configured as an intermediary structure that is positioned axially between the housing base and the housing cover.

Figure 1:
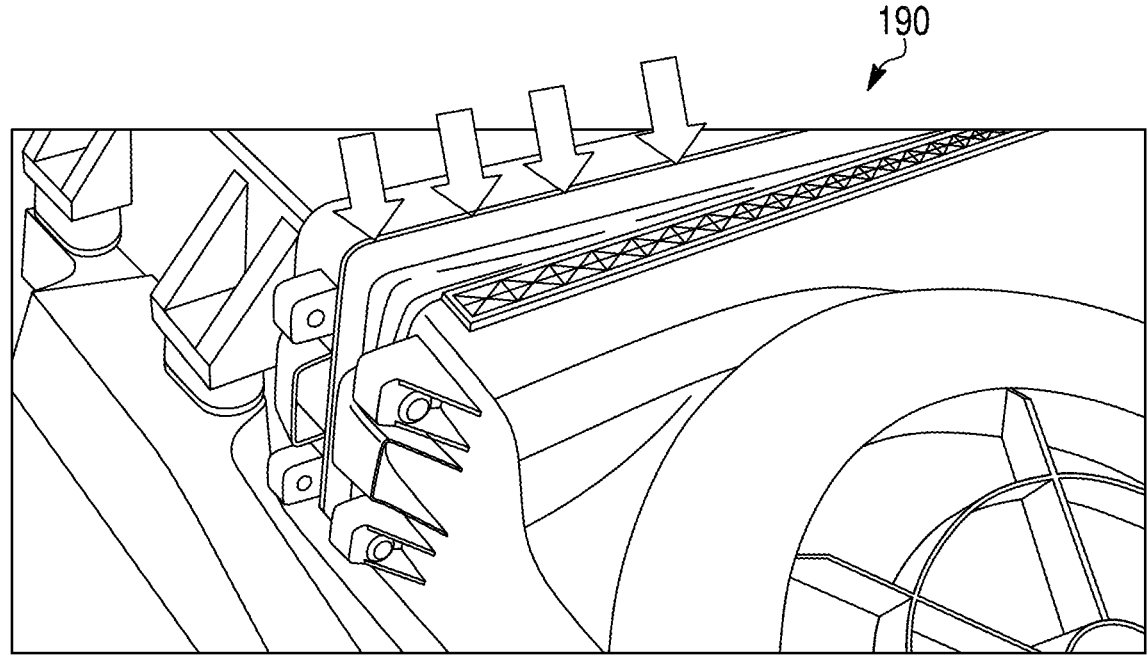
FIG. 1 is a perspective view of a conventional filter housing.
Figure 2A:
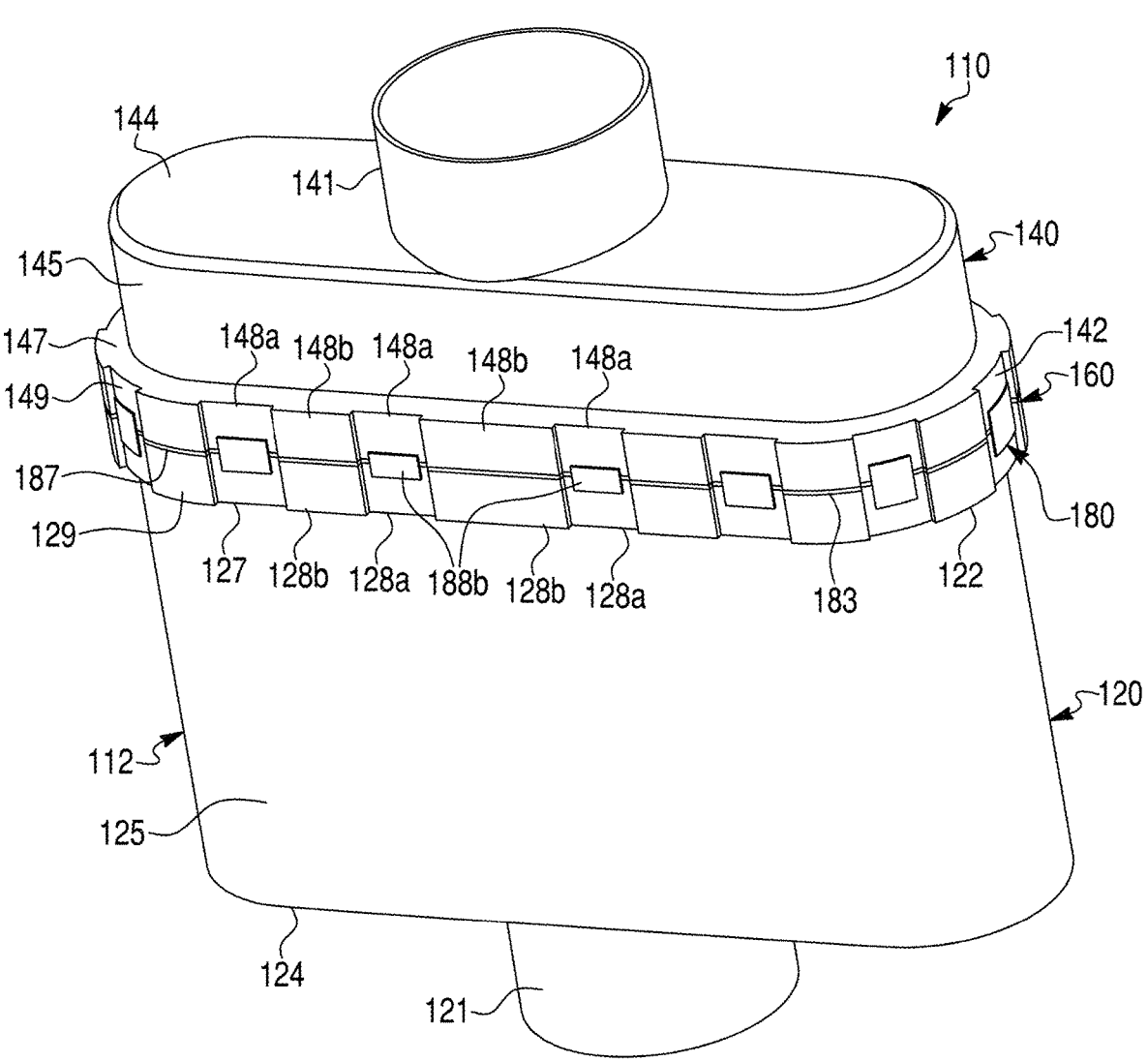
FIG. 2A is a perspective view of a filter assembly according to one embodiment.
Figure 2B:
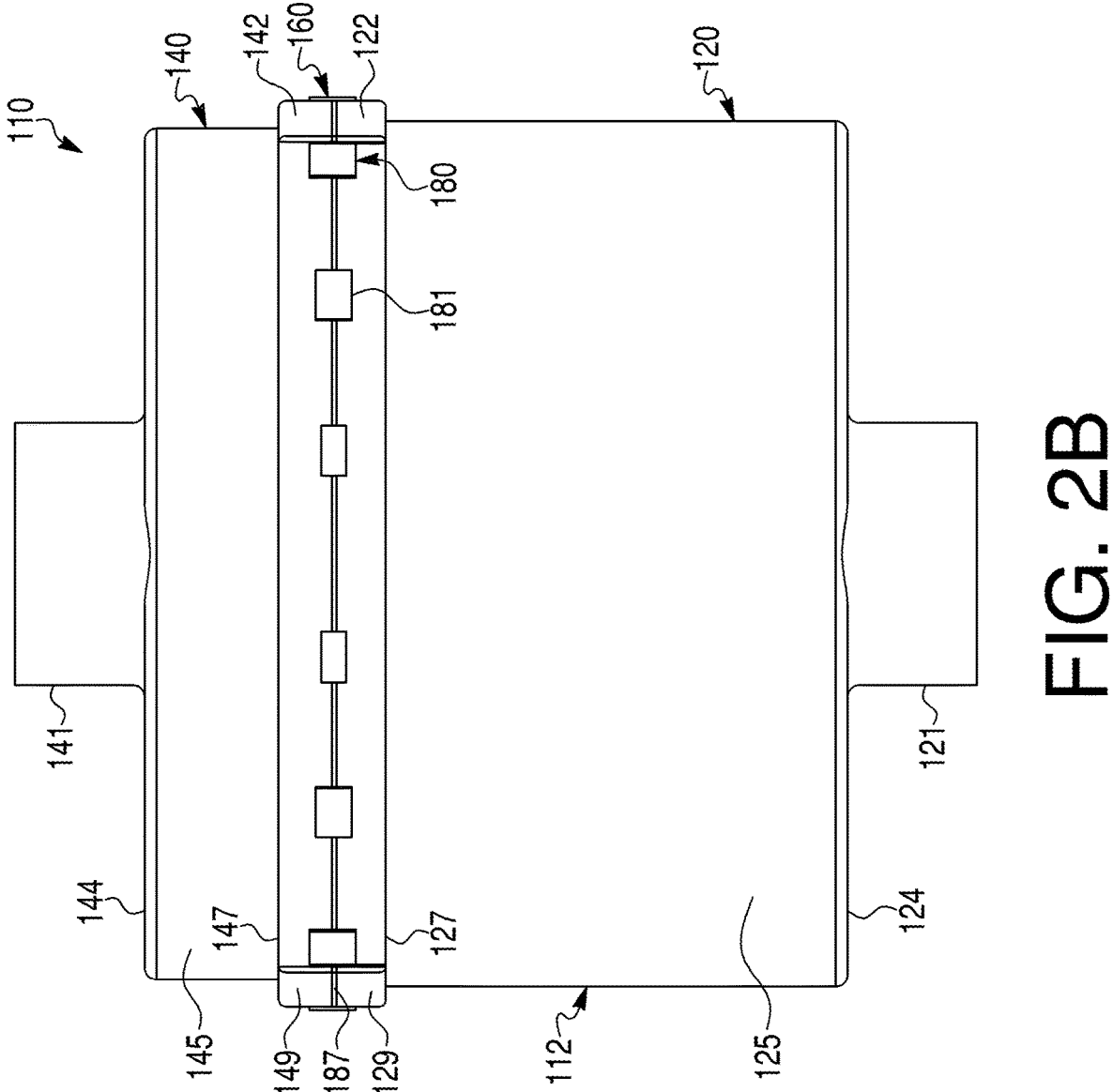
FIG. 2B is a side view of the filter assembly of FIG. 2A.

In FIGS. 2A-2B, a filter assembly 110 is shown, according to one embodiment. The filter assembly 110 comprises a housing assembly 112 and a filter element 160 that are attachable together with various guiding and positioning features, as described further herein. The filter assembly 110 may be used to filter a fluid such air. For reference, the axial direction refers to a direction that is substantially parallel to the flow of fluid through the housing assembly 112 and through the filter element 160. The radial direction refers to a direction that is substantially perpendicular to the flow of fluid through the housing assembly 112.

The configuration of the filter assembly 110 helps protect and retain the filter element 160, improves the ease of servicing the filter assembly 110, forms improved seals to prevent leakage, and can be used with a wide variety of different filter elements that utilize axial seals. Additionally, the size and volume of the filter assembly 110 (in particular the housing assembly 112) is minimized, and a variety of different fastening methods and styling schemes can be used.

Figure 5:
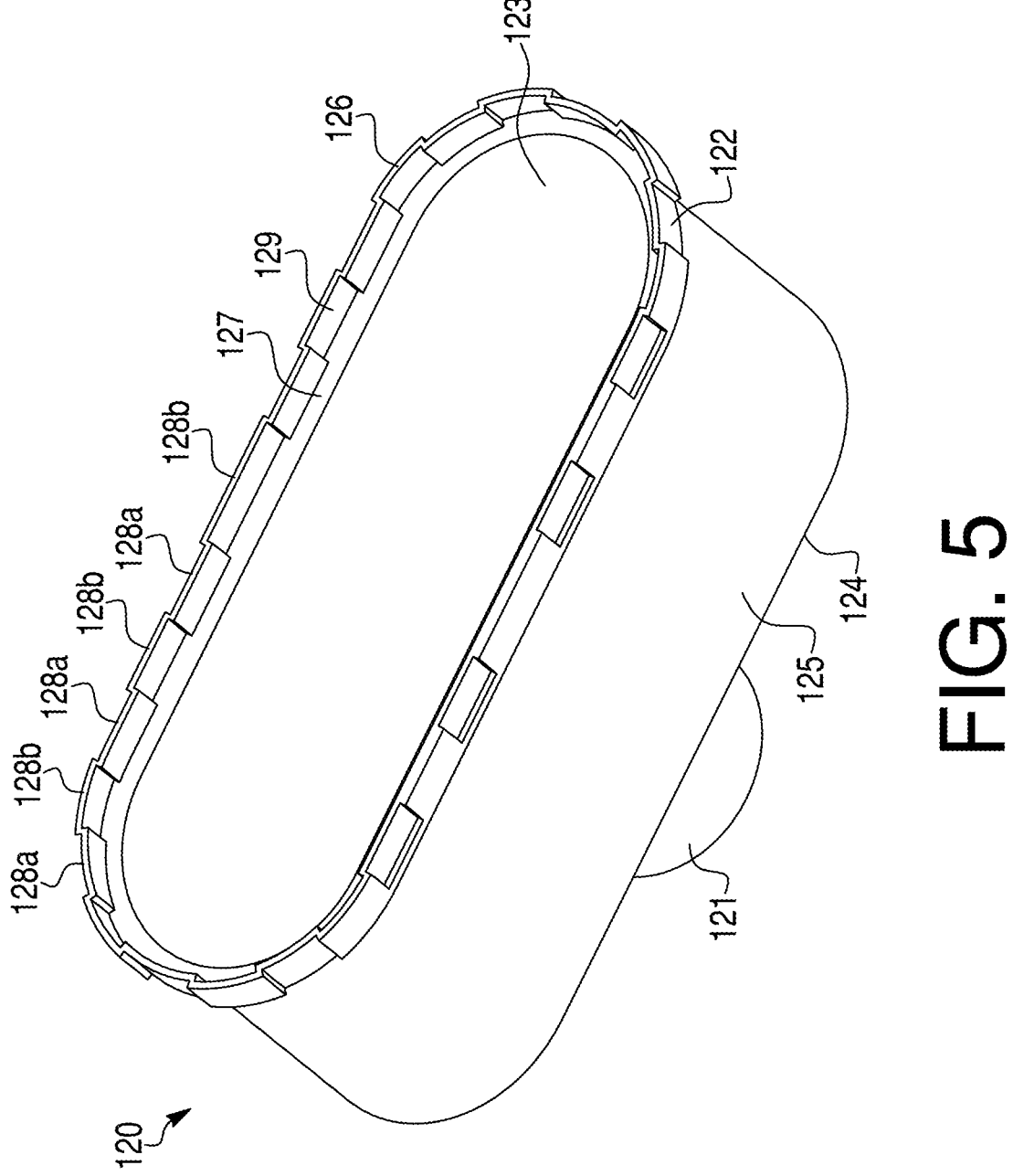
FIG. 5 is a perspective view of a housing base of the filter assembly of FIG. 2A.
Figure 6:
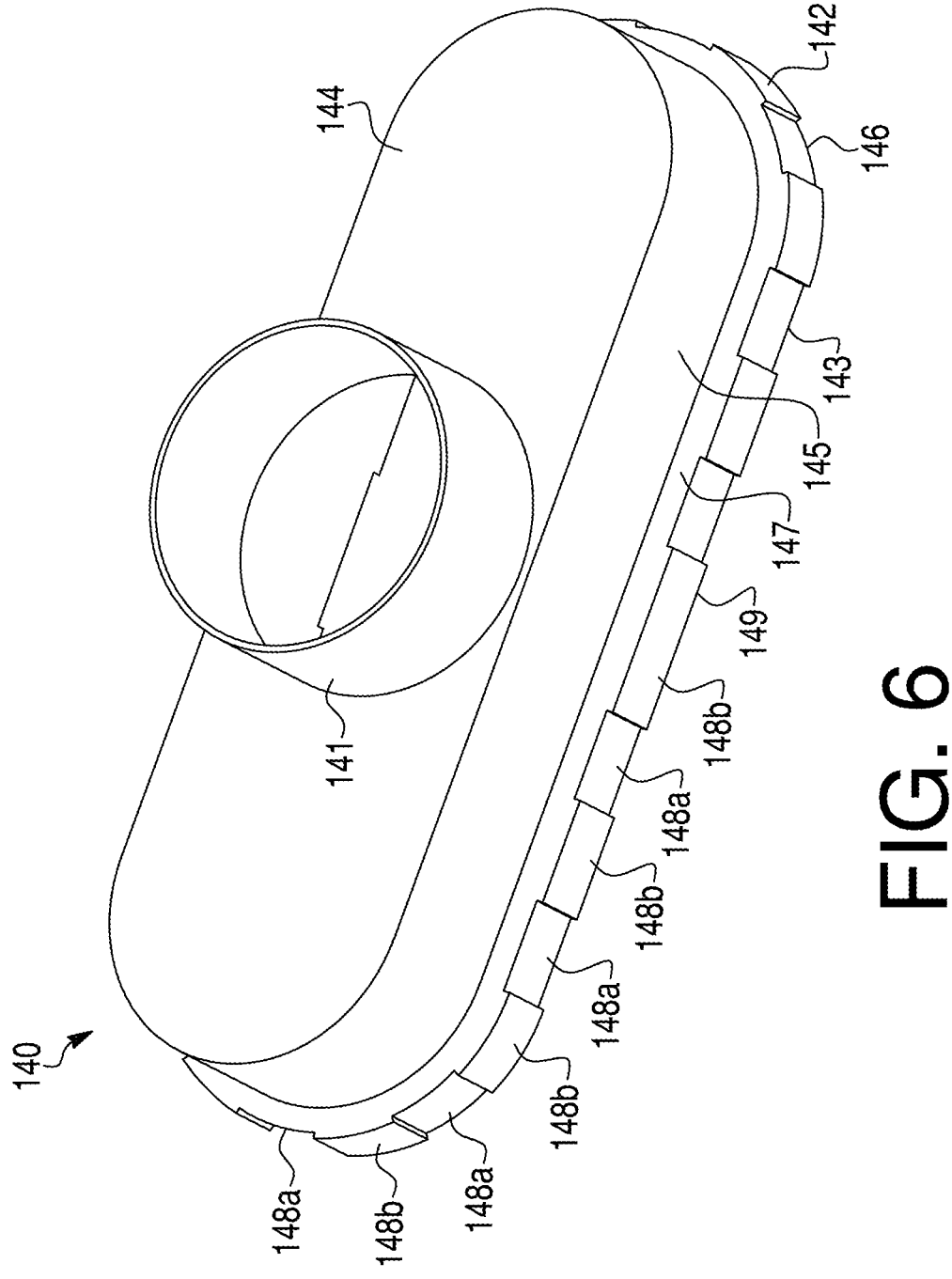
FIG. 6 is a perspective view of a housing cover of the filter assembly of FIG. 2A.
Figure 13:
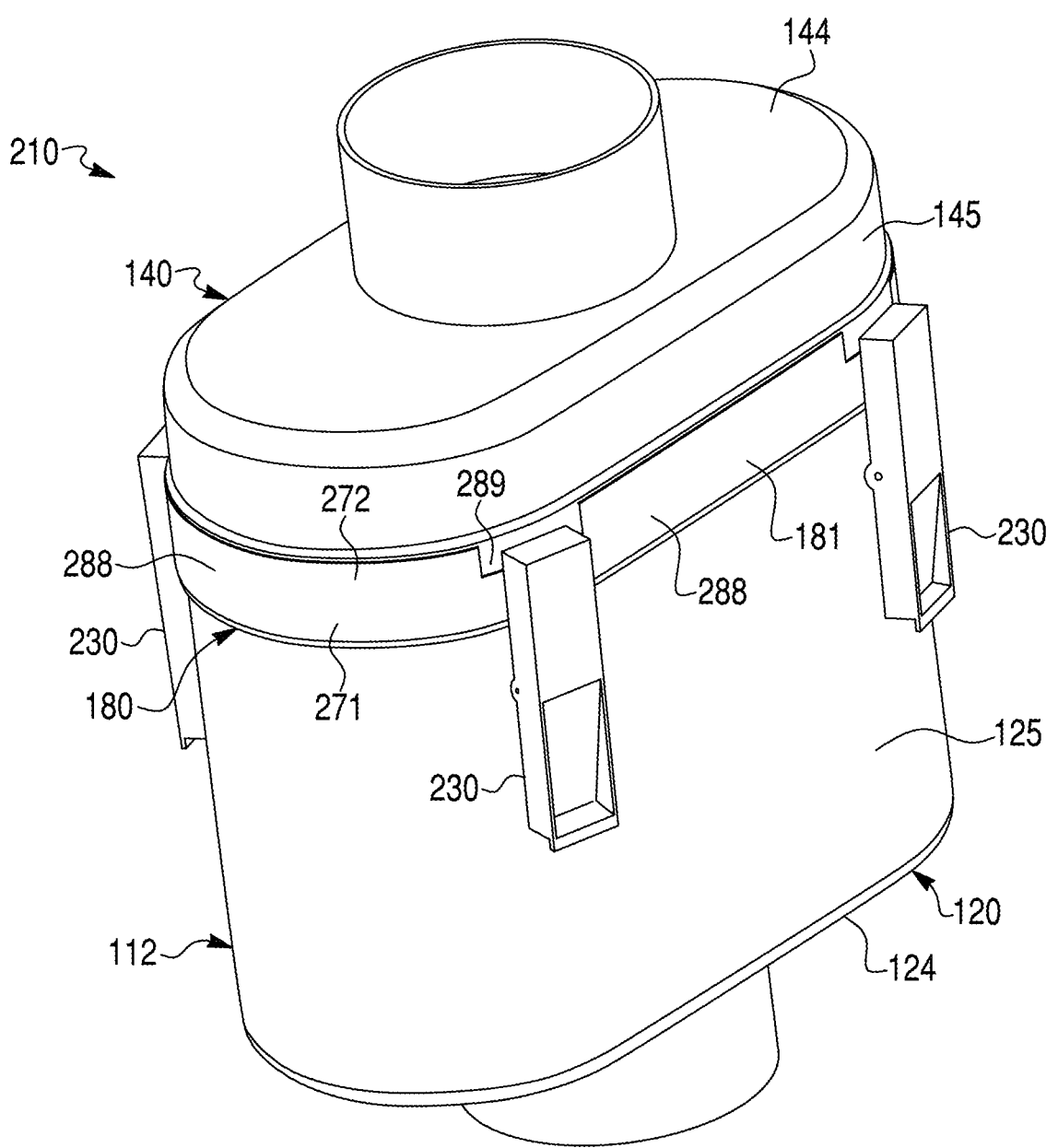
FIG. 13 is a perspective view of a filter assembly according to another embodiment.

The housing assembly 112 is configured to contain or house the filter element 160 and comprises a housing body or base 120 (as shown in FIG. 5) and a housing cover 140 (as shown in FIG. 6). The housing base 120 and the housing cover 140 are positioned along opposite sides or axial ends of the filter element 160 (with the frame 180 of the filter element 160 (as described further herein) in between). The housing base 120 comprises a base fluid port 121, and the housing cover 140 comprises a cover fluid port 141. One of the base fluid port 121 or the cover fluid port 141 is an inlet fluid port, and the other of the base fluid port 121 or the cover fluid port 141 is an outlet fluid port. Accordingly, unfiltered fluid flows into the housing assembly 112 of the filter assembly 110 through one of the base fluid port 121 or the cover fluid port 141 and flows through the filter media 162 (to be filtered by the filter element 160), and filtered fluid flows out from the housing assembly 112 of the filter assembly 110 through the other of the base fluid port 121 or the cover fluid port 141. Optionally, the housing base 120 and/or the housing cover 140 may include various fasteners, such as over-center latches (as shown in FIG. 13, for example), clips, or through-bolts to secure the housing assembly 112 together. The cross-sectional shape of the housing assembly 112 (along a radially-extending plane), as well as the filter element 160, may be substantially oval.

The housing base 120 defines a base opening 123, and the housing cover 140 defines a cover opening 143. One or both of the base opening 123 and/or the cover opening 143 is approximately the same shape and size as (and optionally larger than) the first flow face 164 and the second flow face 165 of the filter media 162 (as described further herein), thereby maximizing the flow area within the housing assembly 112 and allowing the entire filter media 162 to fit within the housing assembly 112 (where at least a portion of the axial flow length of the filter media 162 fits within the housing base 120 and/or the housing cover 140). The base fluid port 121 may be directly opposite the base opening 123, and the cover fluid port 141 may be directly opposite the cover opening 143, thereby allowing fluid to flow in one direction directly between the base fluid port 121 and the cover fluid port 141 and the base opening 123 and the cover opening 143, respectively (while flowing through at least a portion of the filter media 162 therebetween).

Figures 3A, 3B:
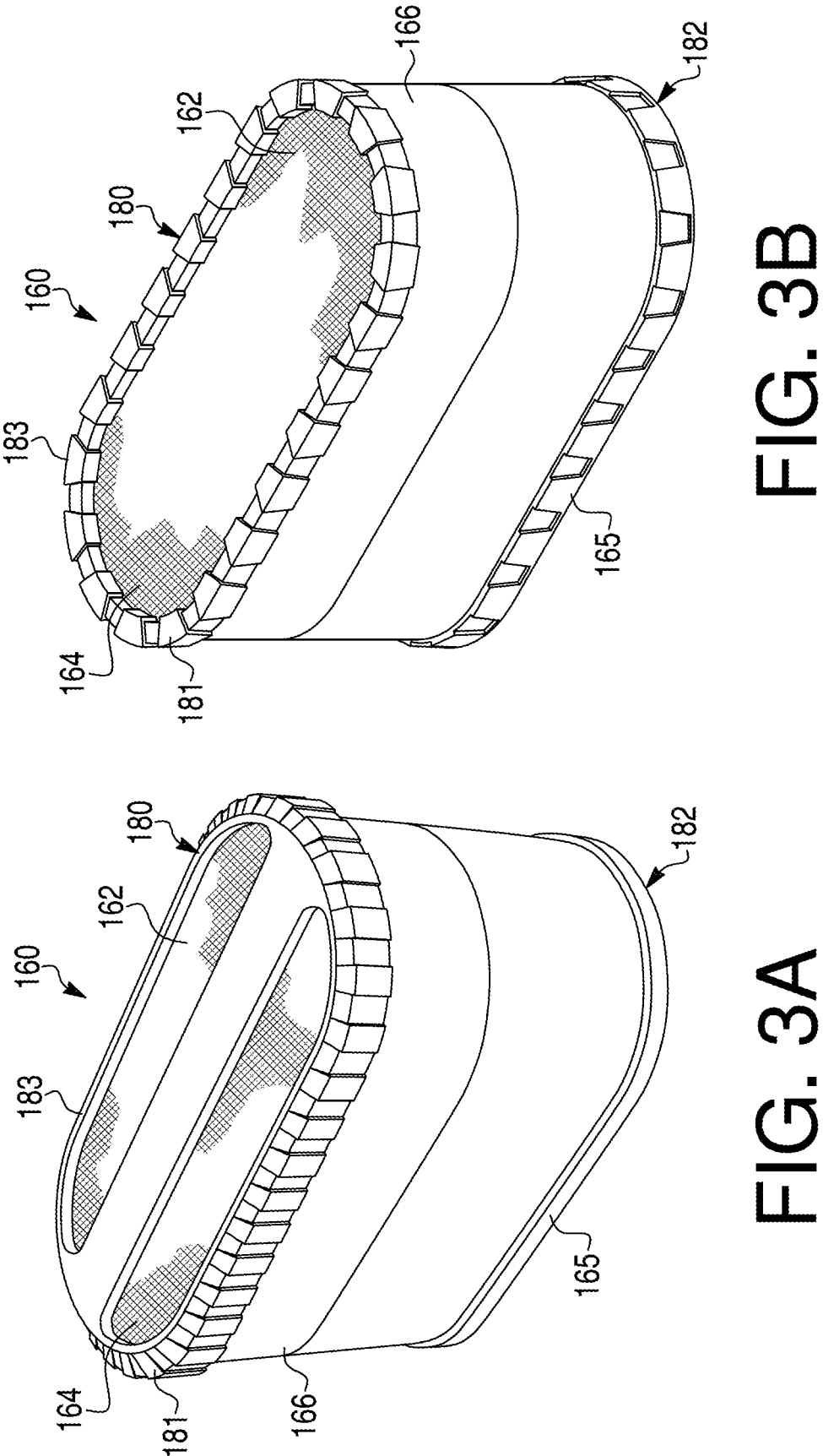
FIGS. 3A-3B are perspective view of filter elements according to various embodiments.

As shown in FIGS. 3A-3B, the filter element 160 comprises a filter media 162 and at least one frame 180 (e.g., an air filter sealing frame). The filter element 160 (in particular the filter media 162) is completely positionable within at least a portion of the housing assembly 112 (for example, at least partially within the housing base 120). The filter media 162 is configured to filter a fluid (such as air) and has and defines a first flow face 164 and a second flow face 165 that are substantially opposite to each other and radially-extending, through which the fluid to be (or being) filtered flows and a side wall 166 extending axially between the first flow face 164 and the second flow face 165 and circumferentially surrounds the middle of the filter media 162 (through which the fluid being filtered flows).

The first flow face 164 and the second flow face 165 extend radially along substantially parallel, radially-extending planes that are substantially perpendicular to the direction of fluid flow through the filter media 162 and the side wall 166. One of the first flow face 164 or the second flow face 165 is an inlet flow face (through which unfiltered fluid flows), and the other of the first flow face 164 and the second flow face 165 is an outlet flow face (through which filtered fluid flows). Accordingly, the fluid flows axially through the filter media 162 between the first flow face 164 and the second flow face 165. The first flow face 164 and the second flow face 165 may optionally be substantially flat and parallel to each other and approximately the same size as each other. However, the filter media 162 may have other shapes in which the first flow face 164 and the second flow face 165 are not parallel to or the same size as each other.

As shown in FIGS. 3A-3B, the filter media 162 may be attached to or potted into the frame 180 such that the frame 180 is secured to and surrounds at least the outer perimeter (in particular the side wall 166) of the filter media 162. The frame 180 may be positioned along an axial end of the filter media 162 (e.g., along the first flow face 164 or the second flow face 165) and/or along the side wall 166 of the filter media 162. The filter element 160 may include one frame 180 or a plurality of frames 180. According to one embodiment as shown in FIGS. 3A-3B, the filter element 160 includes a second frame 182 (in addition to the first frame 180). The second frame 182 may have the same or a different configuration as the first frame 180. For the example, the second frame 182 may or may not be a sealing frame. The second frame 182 may optionally be positioned along an opposite axial end of the filter media 162 as the first frame 180.

The frame 180 may extend axially along only part of or the entire axial length of the filter media 162. As described further herein, the frame 180 is directly alignable with, positionable between, and attachable to both the housing base 120 and the housing cover 140 such that a seal is formed between the frame 180 and at least one of the housing base 120 and the housing cover 140. As the frame 180 is positioned axially between the housing base 120 and the housing cover 140, the frame 180 axially separates the housing base 120 and the housing cover 140 and is an intermediary structure positioned axially between the housing base 120 and the housing cover 140. The frame 180 defines a frame opening 183, within which at least a portion of the filter media 162 is positioned and secured within. The frame 180 may optionally extend axially above and/or below the first flow face 164 or the second flow face 165 of the filter media 162.

Figure 4:
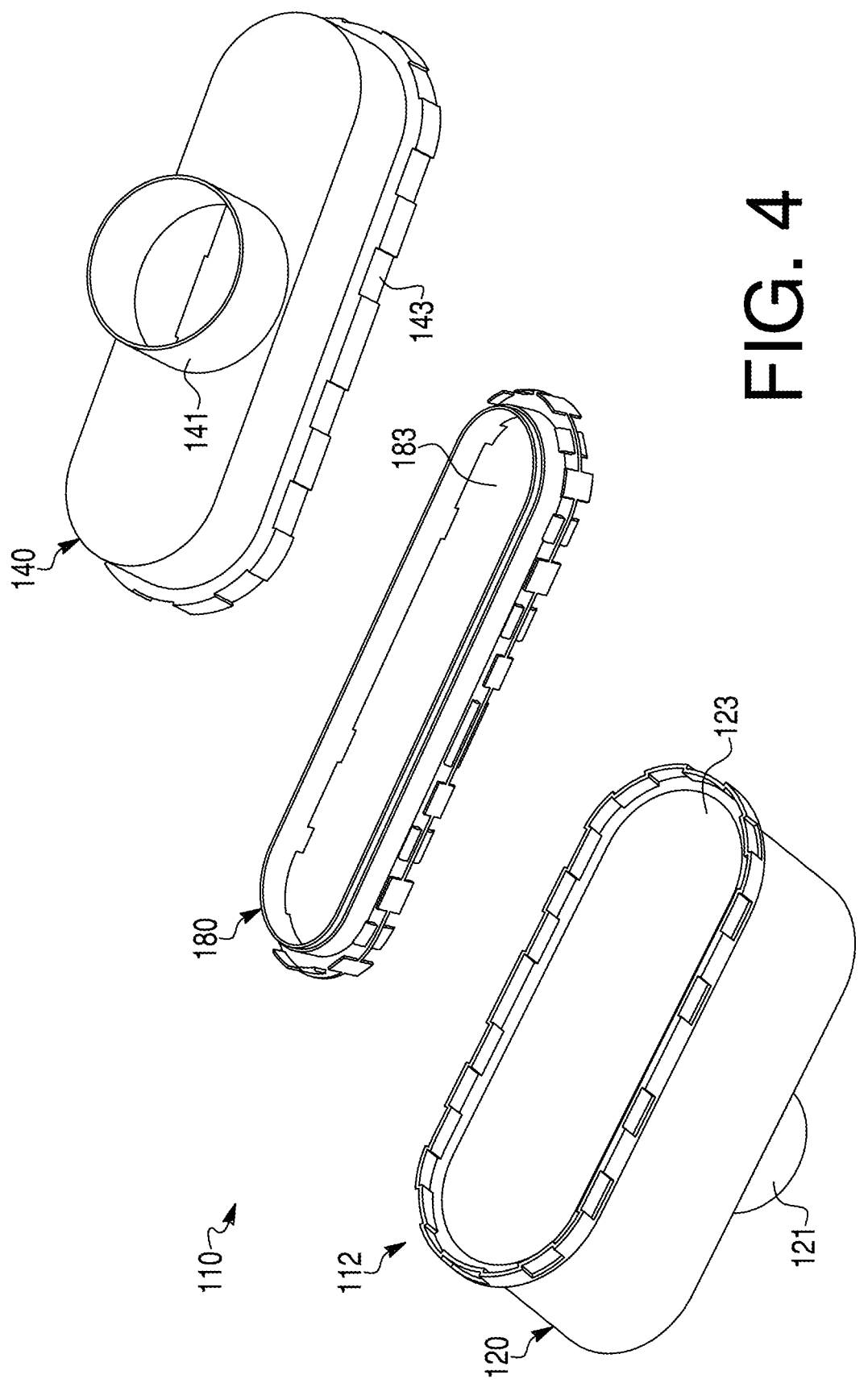
FIG. 4 is an exploded view of the filter assembly of FIG. 2A (without the filter media).

FIG. 4 shows an exploded view of the housing base 120, the housing cover 140, and the frame 180, all of which are attachable together. The frame 180 is positioned axially in between the housing base 120 and the housing cover 140 (in the axial, flow direction through the housing assembly 112). Accordingly, a top portion of the housing base 120 is directly attachable and engagable to a bottom portion of the frame 180 (along the base opening 123), and a bottom portion of the housing cover 140 is directly attachable and engagable to a top portion of the frame 180 (along the cover opening 143). The housing base 120 and the housing cover 140 each attach to and engage with the frame 180 (which is an intermediary structure positioned axially between the housing base 120 and the housing cover 140) and do not directly attach or engage together. Accordingly, the filter assembly 110 cannot be assembled until the filter element 160 (in particular the frame 180) is installed. Specifically, the housing base 120 and the housing cover 140 cannot be assembled together without the frame 180 in place (axially between the housing base 120 and the housing cover 140). Since the frame 180 interlocks with the housing base 120 and the housing cover 140 (as described further herein), the configuration of the filter assembly 110 prevents improper filter elements from being used. Comparatively, in various conventional filter assemblies, a frame may be inserted into the housing body (rather than being positioned axially between the housing body and the cover) and/or a pinch seal gasket (rather than a frame) may separate the housing body and the cover.

Figure 8:
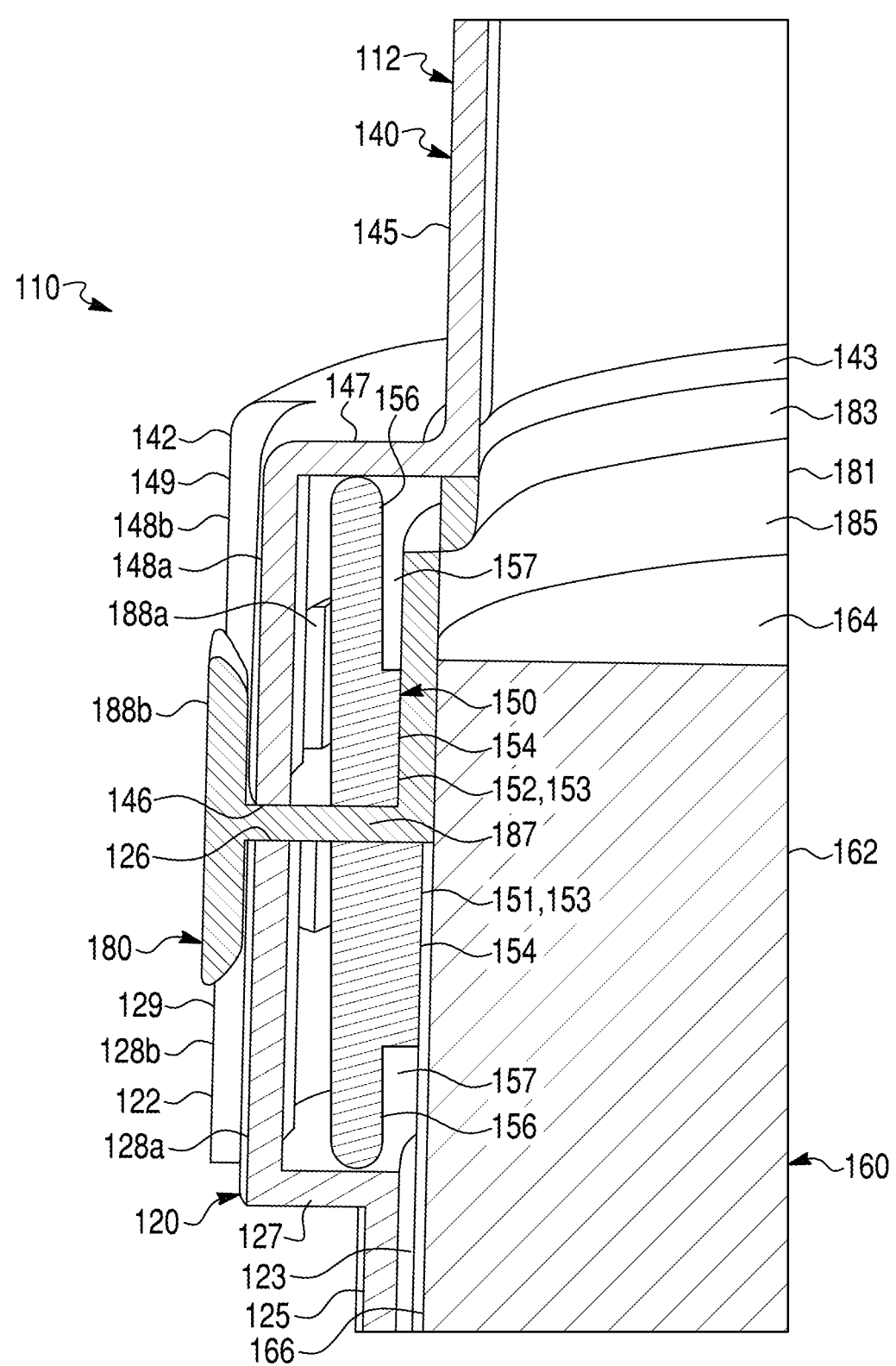
FIG. 8 is a cross-sectional view of a portion of the filter assembly of FIG. 2A.

When the frame 180, the housing base 120, and the housing cover 140 are attached together, the base opening 123, the cover opening 143, and the frame opening 183 are axially aligned with each other (as shown in FIG. 8). The housing base 120, the housing cover 140, and the frame 180 each include various guiding and positioning features (as described further herein) to align with and attach with each other. At least one gasket arrangement 150 (as described further herein) forms a seal between the housing base 120 and the frame body 181 of the frame 180 and between the housing cover 140 and the frame 180. As described further herein, a portion (i.e., the outer extensions 188b) of the frame 180 (e.g., a first subset, a second subset, etc.) extends axially along at least a portion of the outer perimeters of the housing base 120 and the housing cover 140, and a portion (i.e., the inner extension 188a) of the frame 180 (e.g., a first subset, a second subset, etc.) extends axially along at least a portion of the inner perimeter of the housing base 120 and the housing cover 140 (as shown in FIG. 8).

As shown in FIGS. 2B and 5, the housing base 120 comprises a radially-extending base end wall 124, an axially-extending base side or main wall 125, and a base end portion 122. The base end portion 122 comprises a radially-extending base ledge or lip 127, an axially-extending base attachment wall 129, and a base axial edge or end 126. The base end wall 124 extends substantially parallel to the first flow face 164 or the second flow face 165 of the filter media 162, along a radially-extending plane. The base fluid port 121 may extend through and be defined by the base end wall 124. The base end wall 124 is positioned along one axial end of the base main wall 125 (and the base lip 127 is positioned along the other axial end of the base main wall 125). The base main wall 125 and the base attachment wall 129 extend in an axial direction (substantially parallel to the side wall 166 of the filter media 162) and circumferentially surround and define the base opening 123. At least a portion of the axial length of the filter media 162 (i.e., along the side wall 166) may be circumferentially surrounded by the base main wall 125 and the base attachment wall 129. The base end wall 124 and the base end portion 122 are positioned along opposite axial ends of the base main wall 125 from each other. Optionally, if the base end portion 122 does not include the base lip 127, the base end portion 122 may include a portion of the base main wall 125.

The base lip 127 extends radially outward from an axial end of the base main wall 125. The base main wall 125 is positioned along and extends from an inner radial end of the base lip 127, and the base attachment wall 129 is positioned along and extends from an outer radial end of the base lip 127. The base main wall 125 and the base attachment wall 129 extend axially from the base lip 127 in opposite axial directions. The base attachment wall 129 of the housing base 120 (which is an aligning and positioning feature of the housing base 120) extends axially from the outer radial end of the base lip 127 and defines an axial end (e.g., a top end) of the housing base 120. Accordingly, the cross-sectional area defined and encompassed by the base attachment wall 129 is larger than the cross-sectional area defined and encompassed by the base main wall 125 (taken along a radially-extending plane that is substantially perpendicular to the direction of flow through the housing assembly 112). The base axial end 126 is positioned along one axial end of the base attachment wall 129 (that is opposite to the axial end of the base attachment wall 129 that is closer to the base main wall 125). The base axial end 126 may be a first axial end, and the base end wall 124 or a portion of the base fluid port 121 may be the second axial end, where the first axial end and the second axial end are positioned along opposite axial ends of the housing base 120. The base axial end 126 defines the base opening 123.

The base attachment wall 129 of the housing base 120 includes a plurality of base guiding and positioning features (i.e., a plurality of base inner notched portions 128a and a plurality of base outer notched portions 128b) about the entire circumferential length or perimeter of the base attachment wall 129, as shown in FIG. 5. The base inner notched portions 128a are positioned radially inward relative to the base outer notched portions 128b (and the base outer notched portions 128b are positioned radially outward relative to the base inner notched portions 128a). The base inner notched portions 128a and the base outer notched portions 128b are alternatively positioned about the circumferential length of the base attachment wall 129 such the inner surface and the outer surface of the base attachment wall 129 are intermittently stepped radially-inward and radially-outward about the entire length of the base attachment wall 129. The base inner notched portions 128a and the base outer notched portions 128b may extend continuously (e.g., are attached to each other along their axial lengths) such that the base attachment wall 129 extends continuously about the perimeter of the housing base 120. The base inner notched portions 128a and the base outer notched portions 128b are configured to interlock with the inner extensions 188a and the outer extensions 188b of the frame 180 (as described further herein), with the inner extensions 188a and the outer extensions 188b positioned alternatively on opposite sides of the base attachment wall 129.

As shown in FIGS. 2B and 6, the housing cover 140 comprises a radially-extending cover end wall 144, an axially-extending cover side or main wall 145, and a cover end portion 142. The cover end portion 142 comprises a radially-extending cover ledge or lip 147, an axially-extending cover attachment wall 149, and a cover axial edge or end 146. The cover end wall 144 extends substantially parallel to the first flow face 164 and the second flow face 165 of the filter media 162, along a radially-extending plane. The cover fluid port 141 may extend through and be defined by the cover end wall 144. The cover end wall 144 is positioned along one axial end of the cover main wall 145 (and the cover lip 147 is positioned along the other axial end of the cover main wall 145). The cover main wall 145 and the cover attachment wall 149 extend in an axial direction (substantially parallel to the side wall 166 of the filter media 162) and circumferentially surround and define the cover opening 143. At least a portion of the axial length of the filter media 162 (i.e., along the side wall 166) may be circumferentially surrounded by the cover main wall 145 and the cover attachment wall 149. The cover end wall 144 and the cover end portion 142 are positioned along opposite axial ends of the cover main wall 145 from each other. Optionally, if the cover end portion 142 does not include the cover lip 147, the cover end portion 142 may include a portion of the cover main wall 145.

The cover lip 147 extends radially outward from an axial end of the cover main wall 145. The cover main wall 145 is positioned along and extends from an inner radial end of the cover lip 147, and the cover attachment wall 149 is positioned along and extends from an outer radial end of the cover lip 147. The cover main wall 145 and the cover attachment wall 149 extend axially from the cover lip 147 in opposite axial directions. The cover attachment wall 149 of the housing cover 140 (which is an aligning and positioning feature of the housing cover 140) extends axially from the outer radial end of the cover lip 147 and defines an axial end (e.g., a bottom portion) of the housing cover 140. Accordingly, the cross-sectional area defined and encompassed by the cover attachment wall 149 is larger than the cross-sectional area defined and encompassed by the cover main wall 145 (taken along a radially-extending plane that is substantially perpendicular to the direction of flow through the housing assembly 112). The cover axial end 146 is positioned along one axial end of the cover attachment wall 149 (that is opposite to the axial end of the cover attachment wall 149 that is closer to the cover main wall 145). The cover axial end 146 may be a first axial end, and the cover end wall 144 or a portion of the cover fluid port 141 may be the second axial end, where the first axial end and the second axial end are positioned along opposite axial ends of the housing cover 140. The cover axial end 146 defines the cover opening 143.

The cover attachment wall 149 of the housing cover 140 includes a plurality of guiding and positioning features (i.e., a plurality of cover inner notched portions 148a and a plurality of cover outer notched portions 148b) about the entire circumferential length or perimeter of the cover attachment wall 149, as shown in FIG. 6. The cover inner notched portions 148a are positioned radially inward relative to the cover outer notched portions 148b (and the cover outer notched portions 148b are positioned radially outward relative to the cover inner notched portions 148a). The cover inner notched portions 148a and the cover outer notched portions 148b are alternatively positioned about the circumferential length of the cover attachment wall 149 such the inner surface and the outer surface of the cover attachment wall 149 are intermittently stepped radially-inward and radially-outward about the entire length of the cover attachment wall 149. The cover inner notched portions 148a and the cover outer notched portions 148b may extend continuously (e.g., are attached to each other along their axial lengths) such that the cover attachment wall 149 extends continuously about the perimeter of the housing cover 140. The cover inner notched portions 148a and the cover outer notched portions 148b are configured to interlock with the inner extensions 188a and the outer extensions 188b of the frame 180 (as described further herein), with the inner extensions 188a and the outer extensions 188b positioned alternatively on opposite sides of the cover attachment wall 149.

Figure 7A:
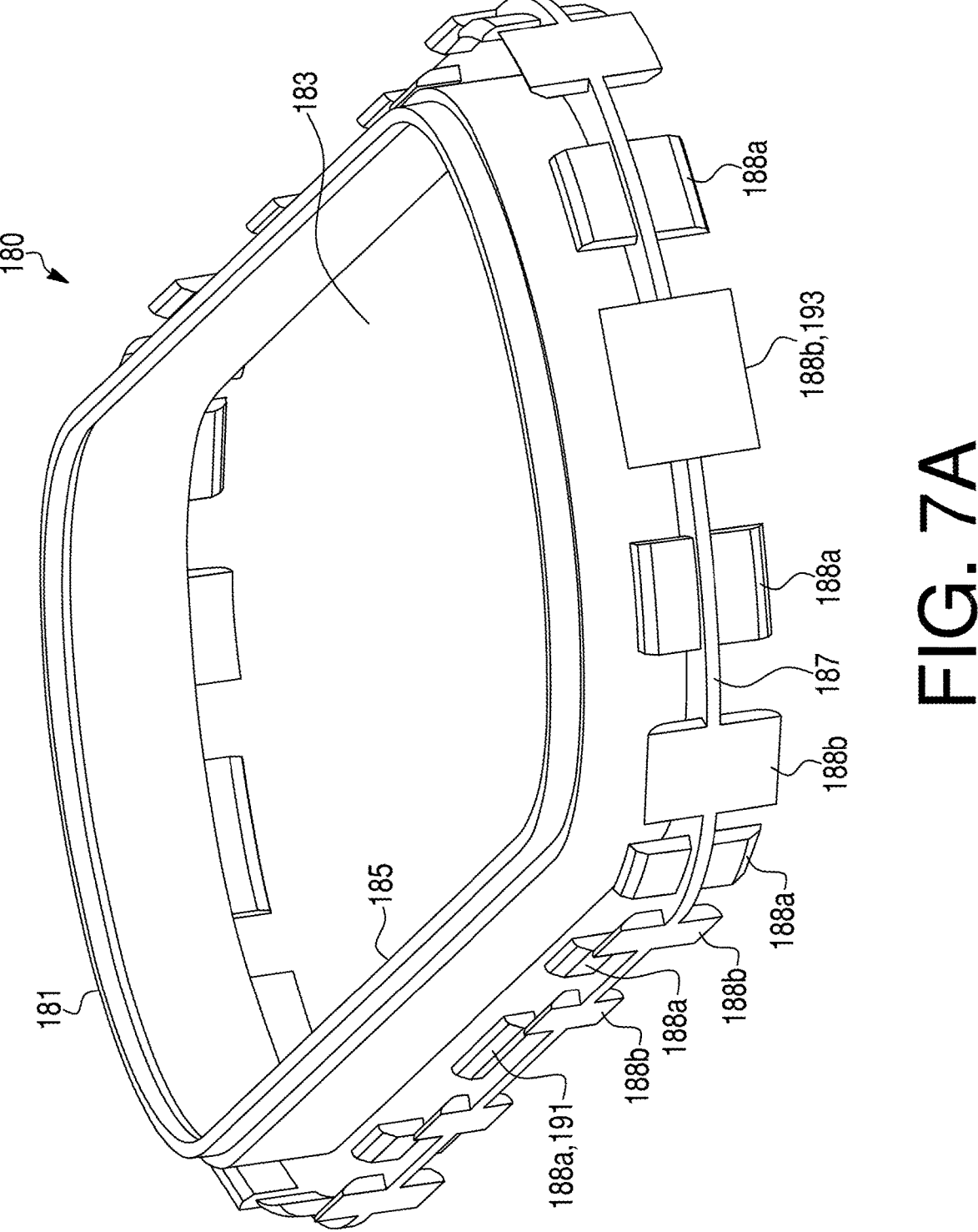
FIG. 7A is a perspective view of a frame of the filter assembly of FIG. 2A.

As shown in FIGS. 7A-8, the frame 180 comprises a frame body 181 and a gasket arrangement 150 (as described further herein). The frame body 181 is constructed as a single-piece and comprises a single, integral, unitary component that cannot be separated without destruction. The frame body 181 of the frame 180 may be a polymer support frame. The frame body 181 of the frame 180 comprises an axially-extending, inner wall 185 and a radially-extending ledge, lip, or flange 187, each of which extend circumferentially about the outer perimeter of the filter media 162. The inner tab, rib, or wall 185 extends axially along the outer surface of the filter media 162 (substantially parallel to the side wall 166 of the filter media 162) (as shown in FIG. 8) and circumferentially surrounds and defines the frame opening 183. At least a portion of the axial length of the filter media 162 (i.e., along the side wall 166) may be circumferentially surrounded by the inner wall 185. The inner wall 185 may extend axially above and below the flange 187 (as described further herein and shown in FIG. 17) or may be positioned along and extend from only one axial side of the flange 187 (as shown in FIG. 8). In particular, one axial end of the inner wall 185 is positioned along and extends axially from an inner radial end of the flange 187. The other axial end of the inner wall 185 abuts against an inner surface of one of the base lip 127 or the cover lip 147, depending on the configuration of the filter assembly (as shown in FIG. 8). The flange 187 extends radially outward from the inner wall 185, optionally from an axial end of the inner wall 185. The inner wall 185 may be positioned along only one axial side of or both axial sides of the flange 187. The flange 187 is positioned axially between the base attachment wall 129 and the cover attachment wall 149.

Figure 7B:
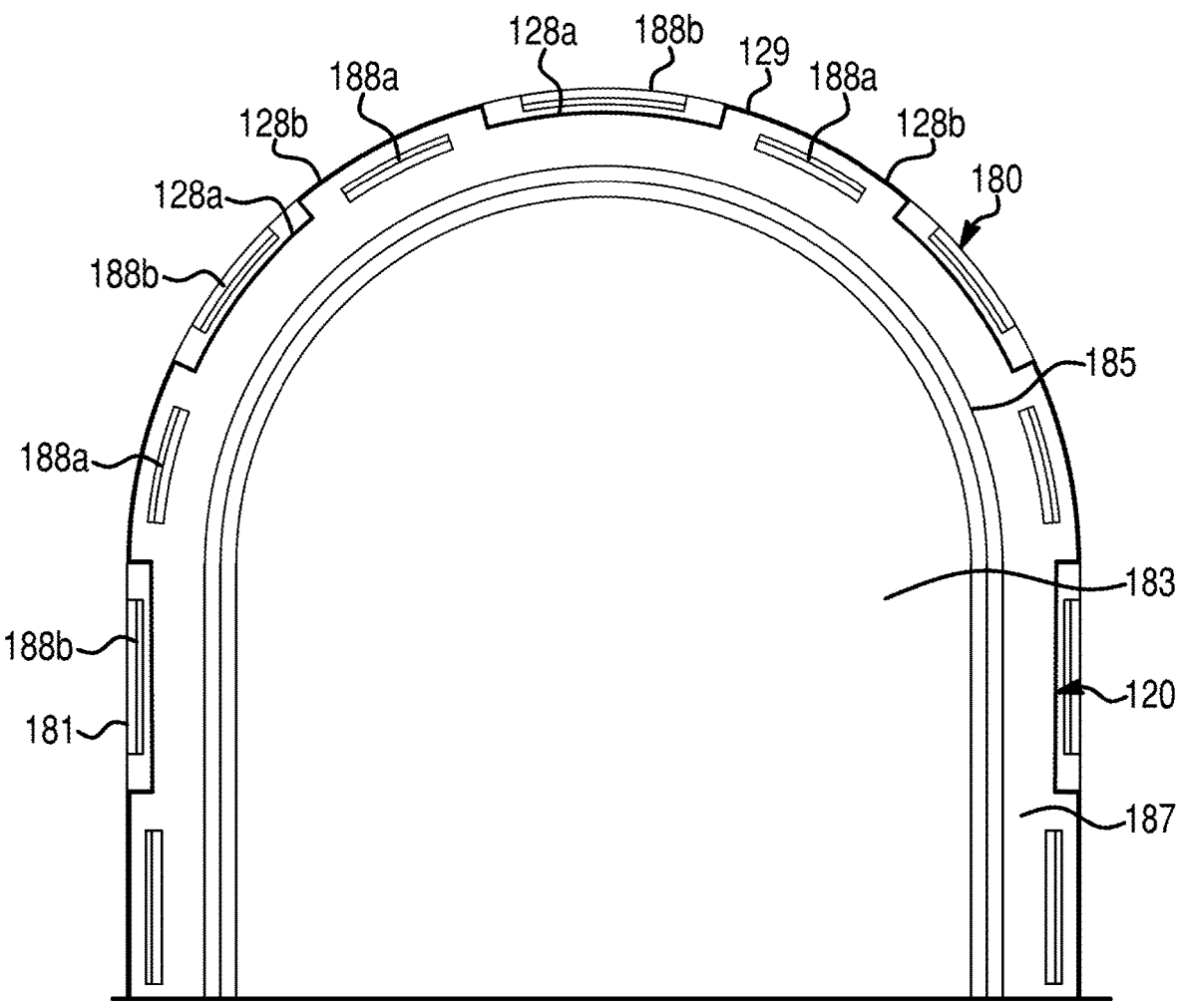
FIG. 7B is a cross-sectional view of a portion of the frame with a portion of the housing assembly of the filter assembly of FIG. 2A.

As shown in FIGS. 7A-7B, the frame body 181 of the frame 180 further comprises a plurality of guiding and positioning features (i.e., a plurality of axially-extending inner tabs or extensions 188a and a plurality of axially-extending outer tabs or extensions 188b) that are positioned intermittently along the flange 187 and align the frame 180 to the housing base 120 and/or the housing cover 140. The inner extensions 188a are positioned radially inward relative to the outer extensions 188b (and the outer extensions 188b are positioned radially outward relative to the inner extensions 188a). The inner extensions 188a and the outer extensions 188b are alternatively positioned about the circumferential length or perimeter of the flange 187. As shown in FIG. 7A, the inner extensions 188a and the outer extensions 188b extend axially above and below the flange 187, each with a first portion or axial end along one axial side of the flange 187 and a second portion or axial end along the other axial side of the flange 187. The inner extensions 188a and the outer extensions 188b are circumferentially spaced apart from each other (along the circumferential length or perimeter of the flange 187) and radially spaced apart (outwardly) from the inner wall 185 to provide room to receive the gasket arrangement 150 (as described further herein). Additionally, the inner extensions 188a and the outer extensions 188b extend axially substantially parallel to the inner wall 185. According to another embodiment, the inner extensions 188a and the outer extensions 188b may be connected to each other along their sides and extend continuously around the entire perimeter of the frame body 181 of the frame 180 and the housing assembly 112 (and the base inner notched portions 128a and the base outer notched portions 128b and the cover inner notched portions 148a and the cover outer notched portions 148b may alternatively be spaced apart from each other, respectively).

The inner extensions 188a and the outer extensions 188b prevent the filter assembly 110 from warping by, for example, directing (and maintaining) long, unsupported sections of the housing base 120 and the housing cover 140 into the proper position. In particular, the inner extensions 188a push and direct the warped housing base 120 and the warped housing cover 140 radially outward and into position, while the outer extensions 188b pull and direct the warped housing base 120 and the warped housing cover 140 radially inward and into position, thereby preventing or reducing warpage in both a radially inward direction and a radially outward direction.

The inner extensions 188*a* and the outer extensions 188*b* are configured to correspond to, align with, and interlock with the base attachment wall 129 and the cover attachment wall 149 (in particular to the base inner notched portions 128*a*, the base outer notched portions 128*b*, the cover inner notched portions 148*a*, and the cover outer notched portions 148*b*) of the housing base 120 and the housing cover 140, with the inner extensions 188*a* and the outer extensions 188*b* positioned alternatively on opposite sides of the base attachment wall 129 and the cover attachment wall 149. The size, number, and relative positioning of the inner extensions 188*a* and the outer extensions 188*b* and the base inner notched portions 128*a*, the base outer notched portions 128*b*, cover inner notched portions 148*a*, the cover outer notched portions 148*b* correspond with and complement each other to fit and interlock with each other. The base inner notched portions 128*a* and the base outer notched portions 128*b* of the housing base 120 directly align and interlock with the first axial end of the inner extensions 188*a* and the outer extensions 188*b* of the frame 180 (and not the housing cover 140). Similarly, the cover inner notched portions 148*a* and the cover outer notched portions 148*b* of the housing cover 140 directly align and interlock with the second axial end of the inner extensions 188*a* and the outer extensions 188*b* of the frame 180 (and not the housing base 120).

Figure 17:
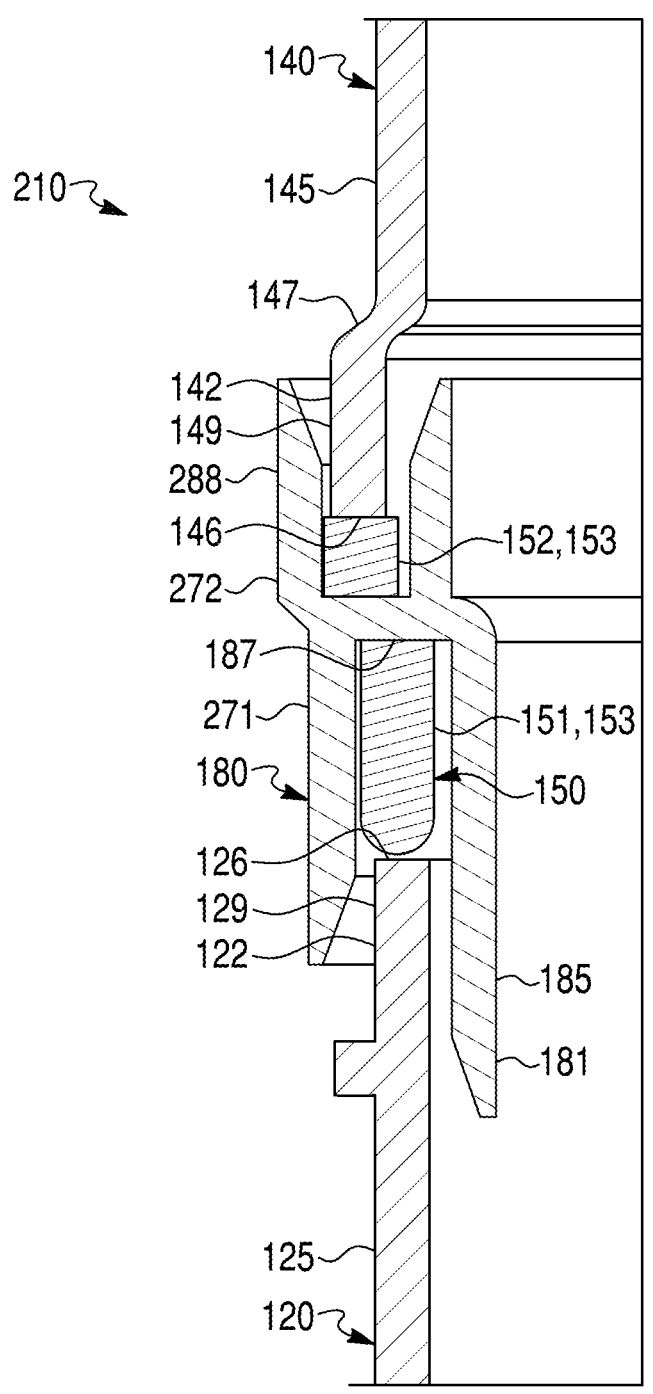
FIG. 17 is a cross-sectional view of a portion of the filter assembly of FIG. 13.

As shown in FIGS. 2A and 7B-8, when the housing base 120 and the housing cover 140 are attached to the frame 180, the frame 180 is positioned axially between and attached to the housing base 120 and the housing cover 140. The frame 180 is configured to engage with the base end portion 122 of the housing base 120 and the cover end portion 142 of the housing cover 140. For example, according to various embodiments, the base axial end 126 may engage with a first surface of the flange 187 of the frame body 181 and/or the cover axial end 146 may engage with a second surface (that is opposite the first surface) of the flange 187 of the frame body 181, as shown in FIG. 8. Alternatively or additionally, an axial end (or opposite axial ends) of the inner wall 185 of the frame body 181 may engage with an inner surface of the base lip 127 and/or an inner surface of the cover lip 147, as further shown in FIG. 8. Alternatively or additionally, an axial end (or opposite axial ends) of the gasket arrangement 150 may engage with (and form a seal with) the inner surface of the base lip 127 and/or the inner surface of the cover lip 147, as further shown in FIG. 8. Alternatively or additionally, the base axial end 126 may engage with (and form a seal with) a first axial end of the gasket arrangement 150 and/or the cover axial end 146 may engage with (and form a seal with) a second axial end (that is opposite the first axial end) of the gasket arrangement 150, as shown in FIG. 17 and described further herein.

As shown in FIGS. 2A and 7B-8, when the housing base 120 is attached to the frame 180, the base attachment wall 129 and the base axial end 126 of the housing base 120 extend along and are positioned and contained radially in between each of the inner extensions 188*a* and the outer extensions 188*b*. In particular, the base attachment wall 129 weaves between the first axial ends of the inner extensions 188*a* and the outer extensions 188*b*. The inner extensions 188*a* of the frame 180 are positioned and extend along the inner surface of the base outer notched portions 128*b* of the base attachment wall 129 of the housing base 120, and the outer extensions 188*b* of the frame 180 are positioned and extend along the outer surface of the base inner notched portions 128*a* of the base attachment wall 129 of the housing base 120, thereby interlocking the frame 180 and the housing base 120 together. The base outer notched portions 128*b* of the base attachment wall 129 extend along the front, radially outer surface of the inner extensions 188*a*, and the base inner notched portions 128*a* of the base attachment wall 129 extend along the back, radially inner surface of the outer extension 188*b*.

As shown in FIGS. 2A and 7B-8, when the housing cover 140 is attached to the frame 180, the cover attachment wall 149 and the cover axial end 146 of the housing cover 140 extend along and are positioned and contained radially in between each of the inner extensions 188*a* and the outer extensions 188*b*. (Although FIG. 7B shows the housing base 120 with the frame 180, the housing cover 140 is attached to the frame 180 in the same or a similar manner (along the opposite axial side of the frame 180).) In particular, the cover attachment wall 149 weaves between the second axial ends of the inner extensions 188*a* and the outer extensions 188*b*. The inner extensions 188*a* of the frame 180 are positioned and extend along the inner surface of the cover outer notched portions 148*b* of the cover attachment wall 149 of the housing cover 140, and the outer extensions 188*b* of the frame 180 are positioned and extend along the outer surface of the cover inner notched portions 148*a* of the cover attachment wall 149 of the housing cover 140, thereby interlocking the frame 180 and the housing cover 140 together. The cover outer notched portions 148*b* of the cover attachment wall 149 extend along the front, radially outer surface of the inner extensions 188*a*, and the cover inner notched portions 148*a* of the cover attachment wall 149 extend along the back, radially inner surface of the outer extension 188*b*.

As shown in FIGS. 2B and 7A, the axial height of the inner extensions 188*a* and the outer extensions 188*b* varies about the circumferential length or perimeter of the flange 187 to gradually and smoothly align the frame 180 with the housing base 120 and the housing cover 140. The height of the inner extensions 188*a* and the outer extensions 188*b* may gradually increase or decrease about the circumferential length or perimeter of the flange 187. The inner extensions 188*a* and the outer extensions 188*b* are shortest along the areas of the filter assembly 110 that are prone to the most warpage (i.e., along the center of the longest, straight walls). In particular, the inner extensions 188*a* and the outer extensions 188*b* that are along the rounded ends or shorter sides of the frame body 181 of the frame 180 (which correspond to the areas of the filter assembly 110 that have low or no warpage) are relatively axially taller or longer than the inner extensions 188*a* and the outer extensions 188*b* that are along the straight or longer sides of the frame body 181 of the frame 180 (which correspond to the areas of the filter assembly 110 that are prone to have more warpage). The shortest extension 191 and the longest extension 193 are labeled in FIG. 7A, according to one embodiment. During assembly, the longer inner extensions 188*a* and the longer outer extensions 188*b* engage with and extend around or along the base attachment wall 129 of the housing base 120 and the cover attachment wall 149 of the housing cover 140 first (along areas with low or no warpage), before the shorter inner extensions 188*a* and the shorter outer extensions 188*b*.

Due to the interlocking between the frame 180 and both the housing base 120 and the housing cover 140, improper filter elements (including, for example, various non-genuine filter elements) are not intended for installation with the housing base 120 or with the housing cover 140. Furthermore, the interlocking ensures that the frame 180 (and thus the entire filter element 160) is properly aligned and forms a complete seal with the housing base 120 and the housing cover 140. Without the frame 180 (which forms a seal with both the housing base 120 and the housing cover 140), the housing base 120 and the housing cover 140 cannot form a proper seal together.

As shown in FIG. 8, the frame 180 further comprises a sealing gasket assembly in the form of a gasket arrangement 150, for example. Due to the relative configuration of the gasket arrangement 150 and the frame body 181 of the frame 180, if the housing base 120 or the housing cover 140 can be engaged with the frame body 181 of the frame 180 (i.e., if the correct housing base 120 or housing cover 140 is attached to the frame 180), the gasket arrangement 150 will be in the proper sealing position. The gasket arrangement 150 allows the housing base 120, the housing cover 140, and the filter element 160 to compactly form a seal together while still aligning together and allowing the gasket arrangement 150 to extend outward. The axial ends of the gasket arrangement 150 may be rounded and/or flat, depending on the desired configuration.

At least a portion of the gasket arrangement 150 (such as the second portion 152) is positioned and extends along the flange 187 (above and/or below the flange 187), radially between the radially inner surfaces of the inner extensions 188*a* and the outer extensions 188*b* and the side wall 166 of the filter media 162. Depending on the configuration of the gasket arrangement 150, at least a portion of the gasket arrangement 150 (such as the first portion 151) may extend along and be positioned radially between the radially outer perimeter or surface of the inner wall 185 of the frame body 181 and the radially inner surfaces of the inner extensions 188*a* and the outer extensions 188*b*. The gasket arrangement 150 may extend continuously around the entire outer perimeter of the filter element 160. The axial ends or edges of the housing base 120 and the housing cover 140 (along the base inner notched portions 128*a* and the cover inner notched portions 148*a*, respectively) are positioned radially between the inner wall 185 and the outer extensions 188*b* and may directly abut against opposite axial surfaces of the flange 187.

Figure 9:
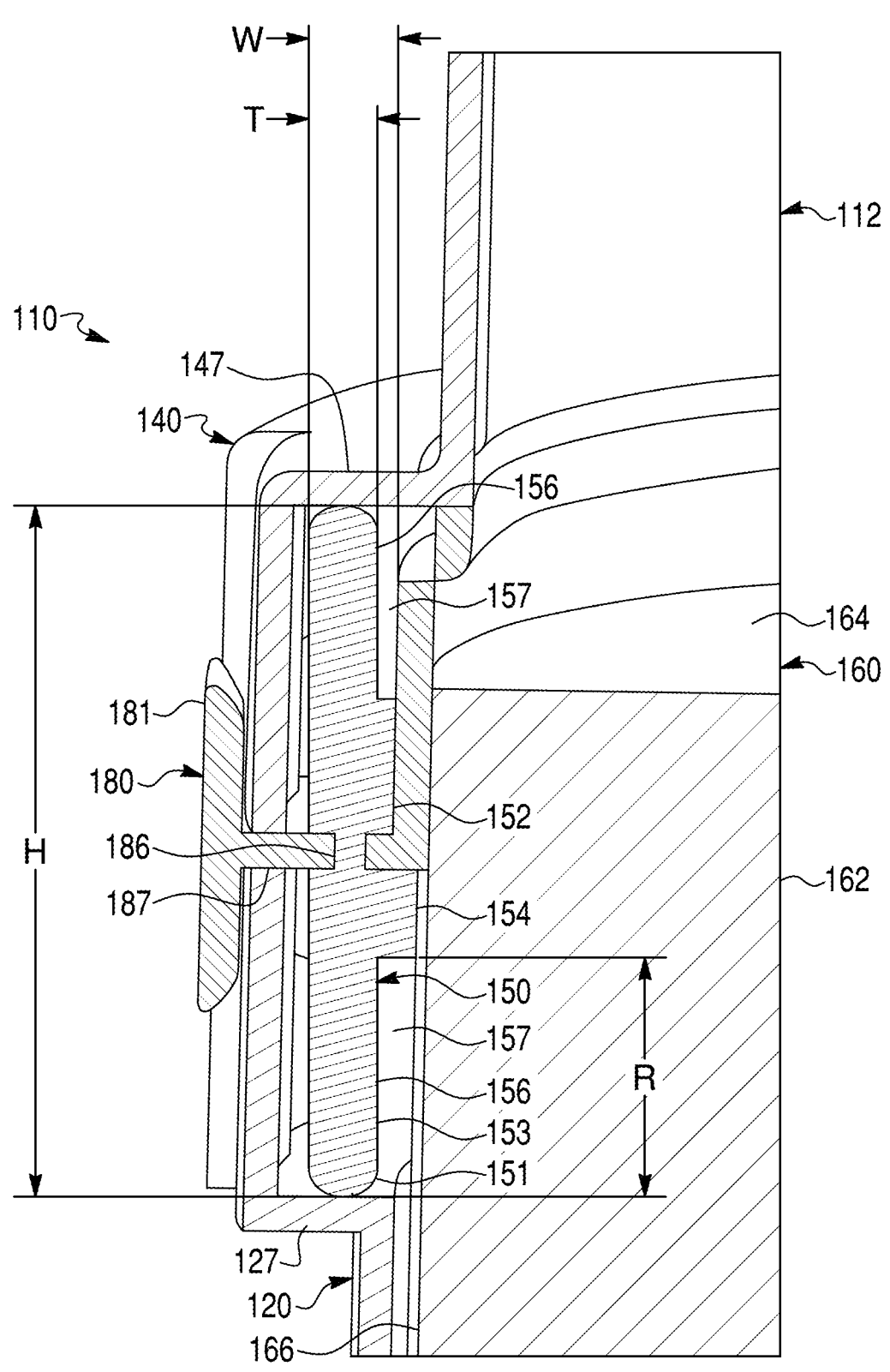
FIG. 9 is a cross-sectional view of a portion of the filter assembly of FIG. 2A.

As shown in FIG. 8, the gasket arrangement 150 comprises a first section or portion 151 and a second section or portion 152 that are positioned along opposite sides of the flange 187. According to one embodiment (as shown in FIG. 9, for example), the gasket arrangement 150 comprises one gasket 153 including both the first portion 151 and the second portion 152. Accordingly, the flange 187 defines at least one aperture 186 extending axially through the flange 187, and the gasket 153 extends through the at least one aperture 186 and along both sides of the flange 187. According to another embodiment, the gasket arrangement 150 may comprise only one gasket 153 that is only positioned along one axial side of the flange 187 (and there is no gasket 153 on the other axial side of the flange 187). According to another embodiment (as shown in FIG. 8, for example), the gasket arrangement 150 comprises two individual gaskets 153 that are separately attached to opposite axial sides of the flange 187 of the frame body 181, where a first gasket 153 is the first portion 151, and a second gasket 153 is the second portion 152. The first gasket 153 may be a lower gasket, and the second gasket 153 may be an upper gasket.

The first portion 151 of the gasket arrangement 150 forms a seal between the frame body 181 of the frame 180 and the housing base 120. In particular, the first portion 151 extends axially between and forms an axial seal between the bottom surface (i.e., a first axial side) of the flange 187 of the frame body 181 and the top inner surface of the base lip 127 of the housing base 120. The second portion 152 of the gasket arrangement 150 forms a seal between the frame body 181 and the housing cover 140. In particular, the second portion 152 extends axially between and forms an axial seal between the top surface (i.e., a second axial side) of the flange 187 of the frame body 181 and the bottom inner surface of the cover lip 147 of the housing cover 140.

The gasket arrangement 150 may be molded (optionally individually) with a foamed polyurethane. The first portion 151 and the second portion 152 may be molded together or individually.

According to various embodiments, the gasket arrangement 150 may or may not protrude through the frame body 181. For example, according to one embodiment (as shown in FIG. 9, for example), the flange 187 of the frame body 181 may define at least one axially-extending opening through-hole, or aperture 186 to allow the gasket arrangement 150 (in particular the polyurethane) to blow and extend through the frame body 181 between two axial sides of the flange 187 and optionally up against and to the outer surface (e.g., the side wall 166) of the filter media 162. However, according to various embodiments, the gasket arrangement 150 may or may not adhere to the outer surface or the side wall 166 of the filter media 162. According to various embodiments, the frame body 181 may be separate adhered to the filter media 162 from the gasket arrangement 150 or alternatively may be attached to the filter media 162 through the gasket arrangement 150.

FIGS. 9-12 show various embodiments of the gasket arrangement 150. According to various embodiments (see, for example, FIG. 9), the gasket arrangement 150 extends axially between the lower inner surface of the cover lip 147 and the upper inner surface of the base lip 127. Accordingly, the axial height H of the entire gasket arrangement 150 (including both the first portion 151 and the second portion 152) may be approximately 40-60 millimeters (mm). The radial width W of the gasket arrangement 150 (along the base 154) may be approximately 4-10 mm. Accordingly, in particular embodiments, the ratio of the height H to width W of the gasket arrangement 150 may range between approximately 4 and 15, and is typically approximately 6 to 8.

The gasket arrangement 150 extends along at least the axial height of the frame body 181 and is relatively long and narrow (in accordance with the ratio of the height H to width W of the gasket arrangement 150) to allow the gasket arrangement 150 to compress more with less force. By being relatively long, the gasket arrangement 150 provides a high compression range to form a seal with warped parts and prevent leakage. The percentage that the gasket arrangement 150 can compress is limited and controlled. By being relatively narrow, the gasket arrangement 150 helps minimize the overall size and volume of the filter assembly 110.

The first portion 151 and the second portion 152 each comprise a base 154 extending axially directly from either the top surface or the bottom surface of the flange 187. As further shown in FIG. 9, the first portion 151 and the second portion 152 further comprise an extension 156 extending axially from the base 154 (in an axial direction away from the flange 187). The extension 156 is radially narrower than the base 154 to define a recess 157 along a radial side of the extension 156 of the first portion 151 or the second portion 152. With the two extensions 156 along the top and bottom of the gasket arrangement 150, the gasket arrangement 150 defines two recesses 157 (i.e., one recess on the top and one recess on the bottom of the gasket arrangement 150). The recess 157 on the bottom of the gasket arrangement 150 provides an area for the poured polyurethane to pool. Both the top and bottom recesses 157 provide room for the extension 156 to compress into. The radially inner side of the extensions 156 may be offset from the radially inner side of the base 154 such that the recesses 157 are positioned along a radially inner side of the extensions 156.

According to one embodiment, the radial width or thickness T of the extension 156 is approximately 2 to 8 mm, and the axial length R of the extension 156 (and thus the axial length of the recess 157) is approximately 2 to 30 mm. The thickness T of the extension 156 is small enough to outwardly limit a size increase of the extension 156, but large enough to create an adequate seal area.

Figure 10:
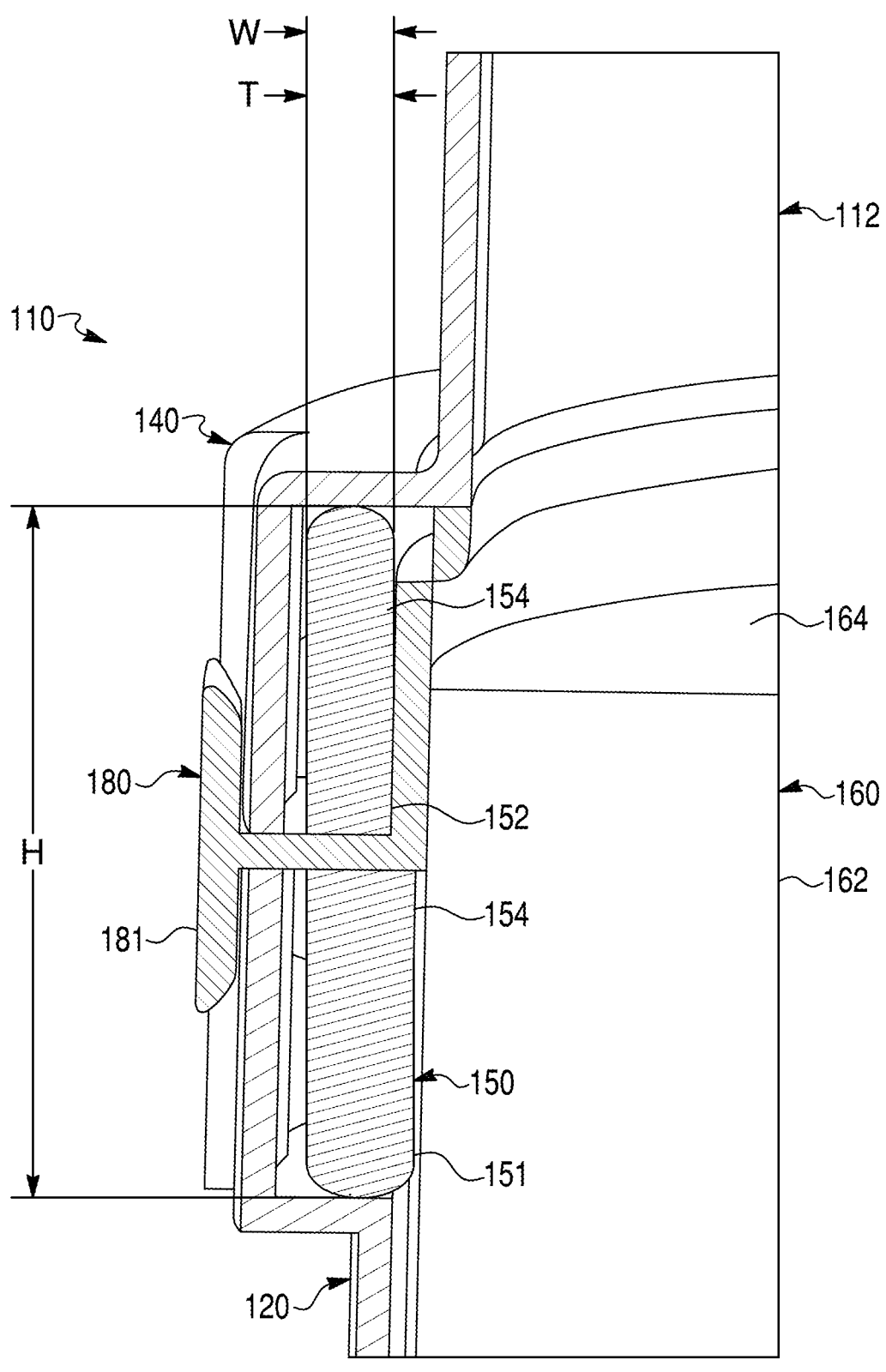
FIG. 10 is a cross-sectional view of a portion of a filter assembly according to another embodiment.

According to another embodiment as shown in FIG. 10, the first portion 151 and the second portion 152 do not include any extensions 156 (and therefore no recesses 157). Instead, the base 154 extends along the entire length of the first portion 151 and the second portion 152. Accordingly, the first portion 151 and the second portion 152 have a constant width W along their axial lengths, and the thickness T is equal to the width W.

Figure 11:
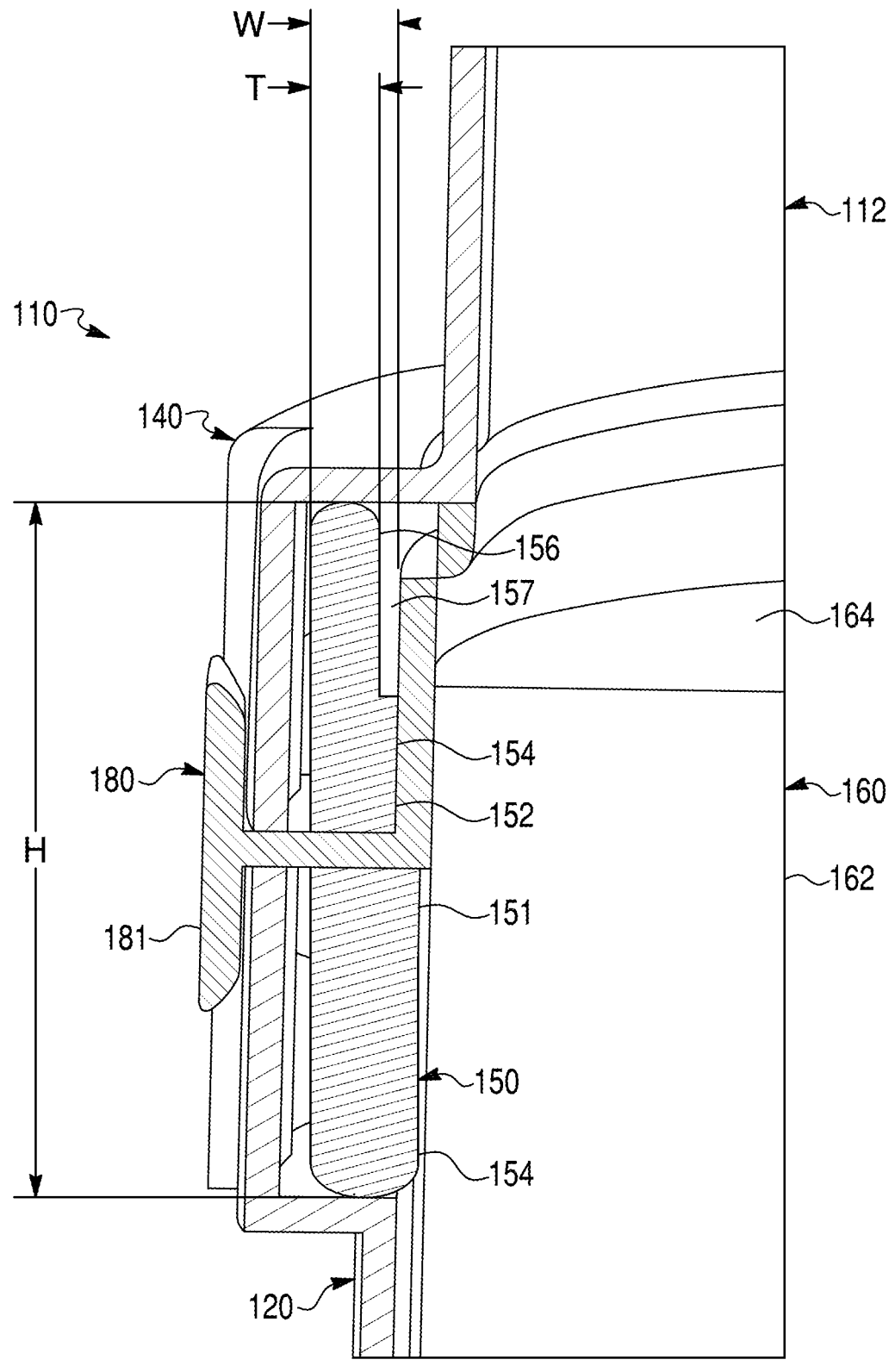
FIG. 11 is a cross-sectional view of a portion of a filter assembly according to yet another embodiment.

According to another embodiment as shown in FIG. 11, only one of the first portion 151 and the second portion 152 includes an extension 156 (and a resulting recess 157). The base 154 of the other of the first portion 151 and the second portion 152 extends along the entire length of the other of the first portion 151 and the second portion 152 (such that the other of the first portion 151 and the second portion 152 has a constant width W across its axial length).

Figure 12:
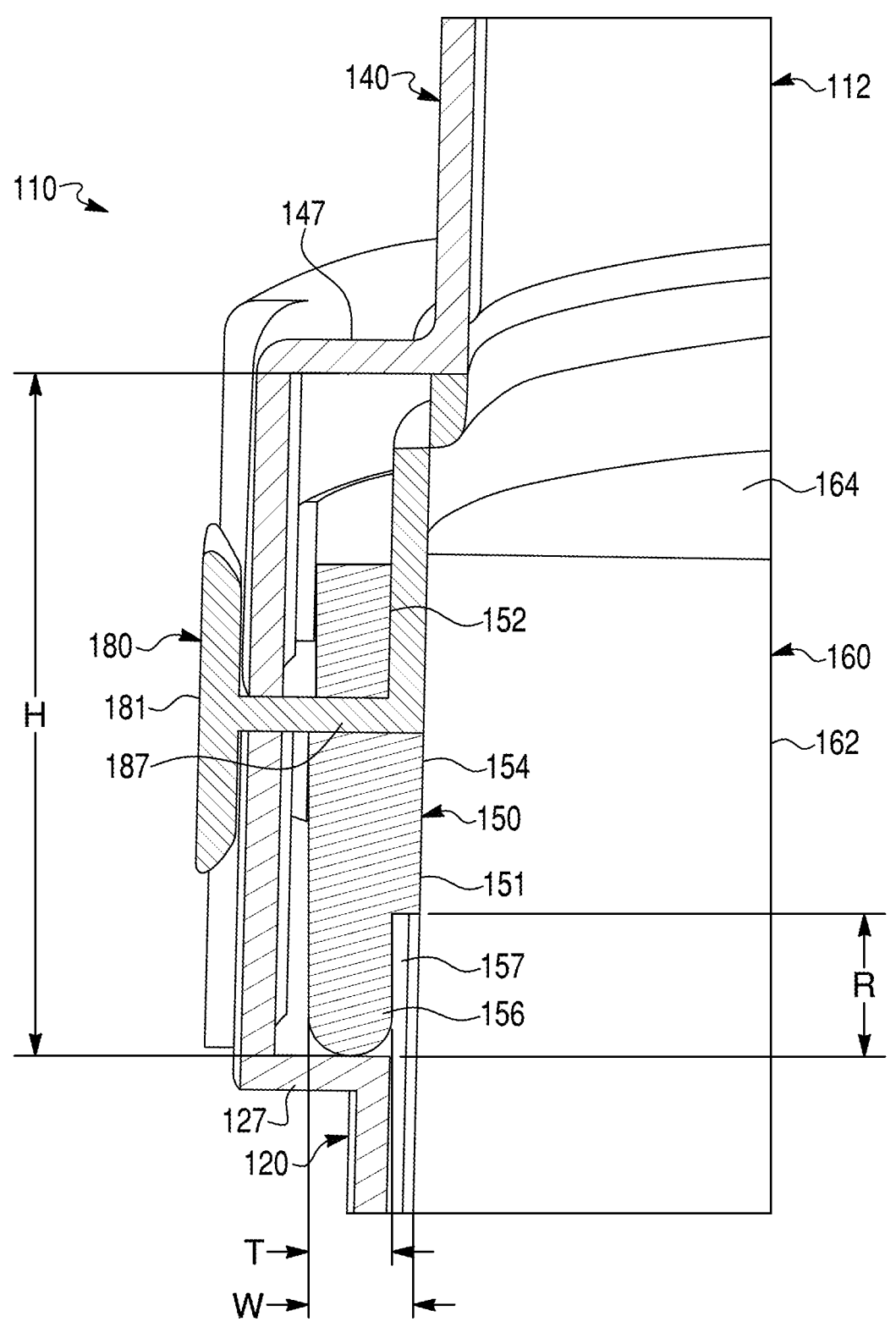
FIG. 12 is a cross-sectional view of a portion of a filter assembly according to still another embodiment.

According to another embodiment as shown in FIG. 12, the gasket arrangement 150 only includes one of the first portion 151 and the second portion 152 (which may or may not include the extension 156 and the resulting recess 157). The gasket arrangement 150 may either not include any the other of the first portion 151 and the second portion 152 or may include only a portion of the axial length of the other of the first portion 151 and the second portion 152 (such that the other of the first portion 151 and the second portion 152 does not extend axially completely between the flange 187 and the base lip 127 of the housing base 120 or the cover lip 147 of the housing cover 140, respectively). Accordingly, the gasket arrangement 150 forms a seal between the frame body 181 and one of the housing base 120 and the housing cover 140, but does not form a seal between the frame body 181 and other of the housing base 120 or the housing cover 140. FIG. 12 shows an example in which the gasket arrangement 150 includes the first portion 151 and only a portion of the axial length of the second portion 152. In particular, in the embodiment of FIG. 12, the axial length of the second portion 152 is significantly less than the axial length of the first portion 151. For example, the axial length of the second portion 152 may be less than half of the axial length of the first portion 151. The second portion 152 does not extend all the way to the cover lip 147 of the housing cover 140. Accordingly, the gasket arrangement 150 of FIG. 12 forms a seal between the frame body 181 and the housing base 120, but does not form a seal between the frame body 181 and the housing cover 140.

According to various embodiments, a seal may be formed between the top of the housing base 120 and the bottom of the housing cover 140. However, according to various embodiments, if a seal is not desired between the frame 180 and the housing cover 140, a notch may be included along the axial length of the second portion 152 of the gasket arrangement 150.

In FIGS. 13-17, another filter assembly 210 is shown, according to another embodiment. Any of the aspects, features, components, benefits, and configurations of the filter assembly 110 and the filter assembly 210 may be used within the other of the filter assembly 110 and the filter assembly 210, except where noted otherwise. Like reference numbers are used with the filter assembly 210 where applicable. The filter assembly 210 comprises the housing assembly 112 (that includes the housing base 120 and the housing cover 140) and the filter element 160 (that includes the frame 180 and the filter media 162), as described further herein.

As shown in FIG. 13, the filter assembly 210 includes at least one fastener 230 that is configured to lock the housing base 120, the filter element 160, and the housing cover 140 together. Although the fastener 230 is shown as an over-center latch, the fastener 230 may be other types of fasteners, including but not limited to another type of latch, a clip, or a through-bolt. According to one embodiment, the filter assembly 210 includes four fasteners 230 positioned about the circumference of the filter assembly 210.

Figure 14:
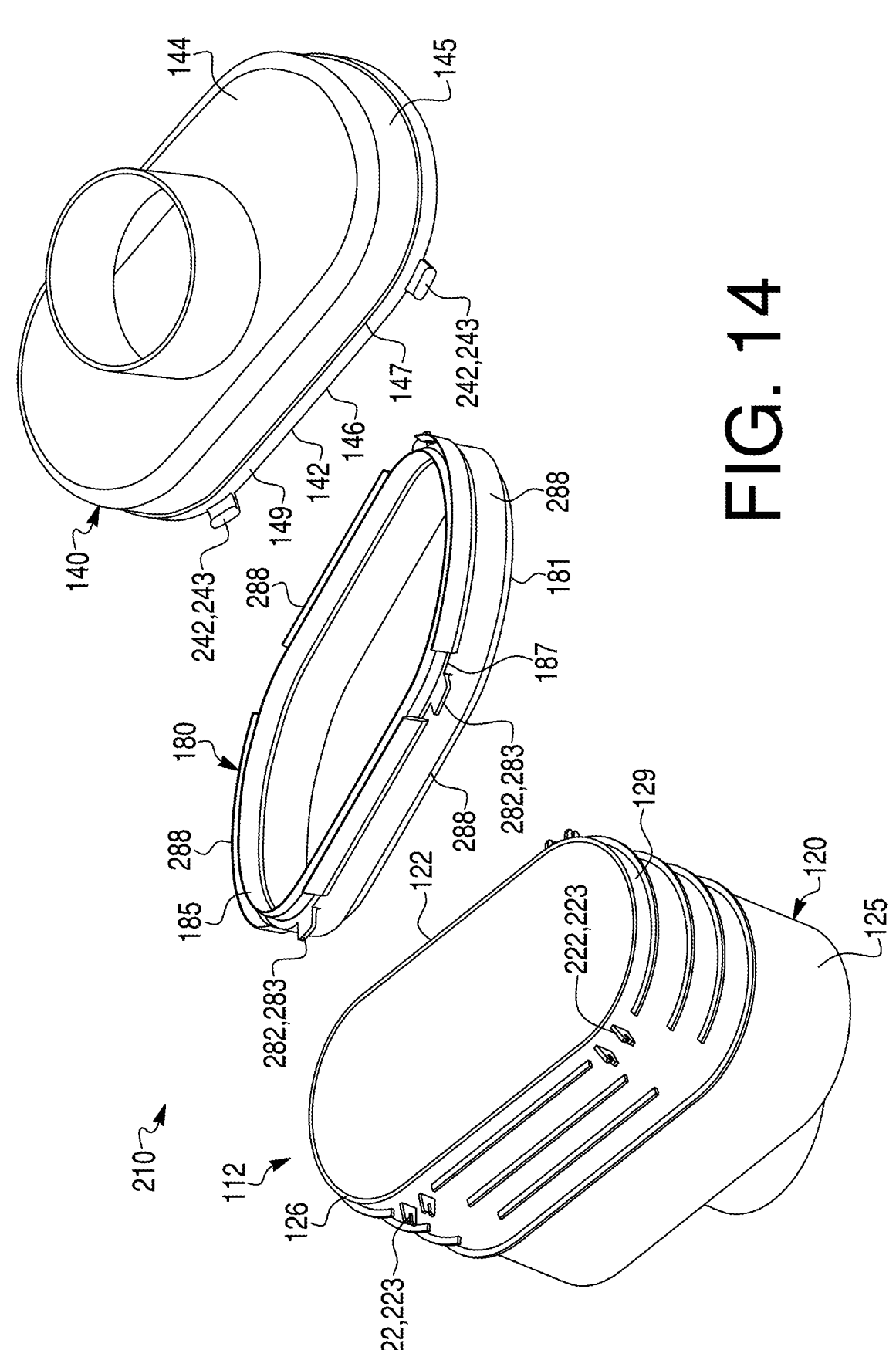
FIG. 14 is an exploded view of the filter assembly of FIG. 13 (without the filter media).

To provide an attachment area for the fastener 230 and the housing base 120, the housing base 120 further comprises a base fastener supporting component 222, the frame body 181 of the frame 180 further comprises a frame fastener supporting component 282, and the housing cover 140 further comprises a cover fastening supporting component 242 (as shown in FIG. 14). The base fastener supporting component 222, the frame fastener supporting component 282, and the cover fastening supporting component 242 together allow the fastener 230 to clamp the filter assembly 210 together. According to one embodiment, one of the base fastener supporting components 222 and the cover fastening supporting components 242 rotatably secures a first axial end of the fastener 230 to the housing base 120 or the housing cover 140, respectively, regardless of whether the fastener 230 is currently clamping the rest of the filter assembly 210 together. For example, the one of the base fastener supporting components 222 and the cover fastening supporting components 242 may be a fastening support arm 223. The fastening support arm 223 includes a notch. As shown in FIG. 14, the base fastener supporting component 222 of the housing base 120 is the fastening support arm 223 that is configured to rotatably secure the first axial end of the fastener 230 via the notch.

The other of the base fastener supporting components 222 and the cover fastening supporting components 242 comprises an attachment lip or tab 243 extending radially outward from the outer surface of the housing base 120 or the housing cover 140, respectively. The attachment tab 243 includes a notch such that the attachment tab 243 is configured to be received and secured by a second axial end of the fastener 230 (that is opposite the first axial end).

The fastener supporting component 282 of the frame 180 comprises a support tab 283 that is configured to axially support one axial side of the attachment tab 243 when the housing base 120, the frame 180, and the housing cover 140 are clamped together. The support tab 283 extends radially outward from the outer surface of the frame body 181 of the frame 180, in particular from the radially outer surface of the flange 187 of the frame body 181 of the frame 180. The support tab 283 is positioned in a gap 289 between two alignment ribs 288 (as described further herein). The support tab 283 is sandwiched axially between the base fastener supporting components 222 and the cover fastening supporting components 242 when the filter assembly 210 is assembled together.

The base fastener supporting component 222, the frame fastening supporting component 282, and the cover fastening supporting component 242 are complementary to each other and axially alignable with each other about the perimeter of the filter assembly 210. The base fastener supporting components 222, the frame fastening supporting component 282, and the cover fastening supporting component 242 are positioned along and extend radially from the outer perimeter of the housing base 120, the frame 180, and the housing cover 140 in order to position the fastener 230 along the outside of the housing base 120, the frame 180, and the housing cover 140. The housing base 120, the frame 180, and the housing cover 140 may each include a plurality of base fastener supporting components 222, a plurality of frame fastening supporting components 282, and a plurality of cover fastening supporting components 242, respectively, spaced apart about the perimeter of the housing base 120, the frame 180, and the housing cover 140 and axially alignable with each other.

To clamp the filter assembly 210 together, the housing base 120, the frame 180, and the housing cover 140 are positioned and nested with each other, and the fastener 230 is subsequently rotated (about the notch of the fastening support arm 223 that is one of the base fastener supporting components 222 and the cover fastening supporting components 242) to position the second axial end of the fastener 230 over and around the attachment tab 243 (that is the other of the base fastener supporting components 222 and the cover fastening supporting components 242). The fastener 230 is also concurrently positioned around the support tab 283 (i.e., the fastener supporting component 282). The fastener 230 can then be snapped or pushed radially inwardly and axially toward the fastening support arm 223, pulling the attachment tab 243 axially toward the support tab 283 and the fastening support arm 223 (and thereby clamping the housing base 120, the frame 180, and the housing cover 140 together).

Figures 15A, 15B:
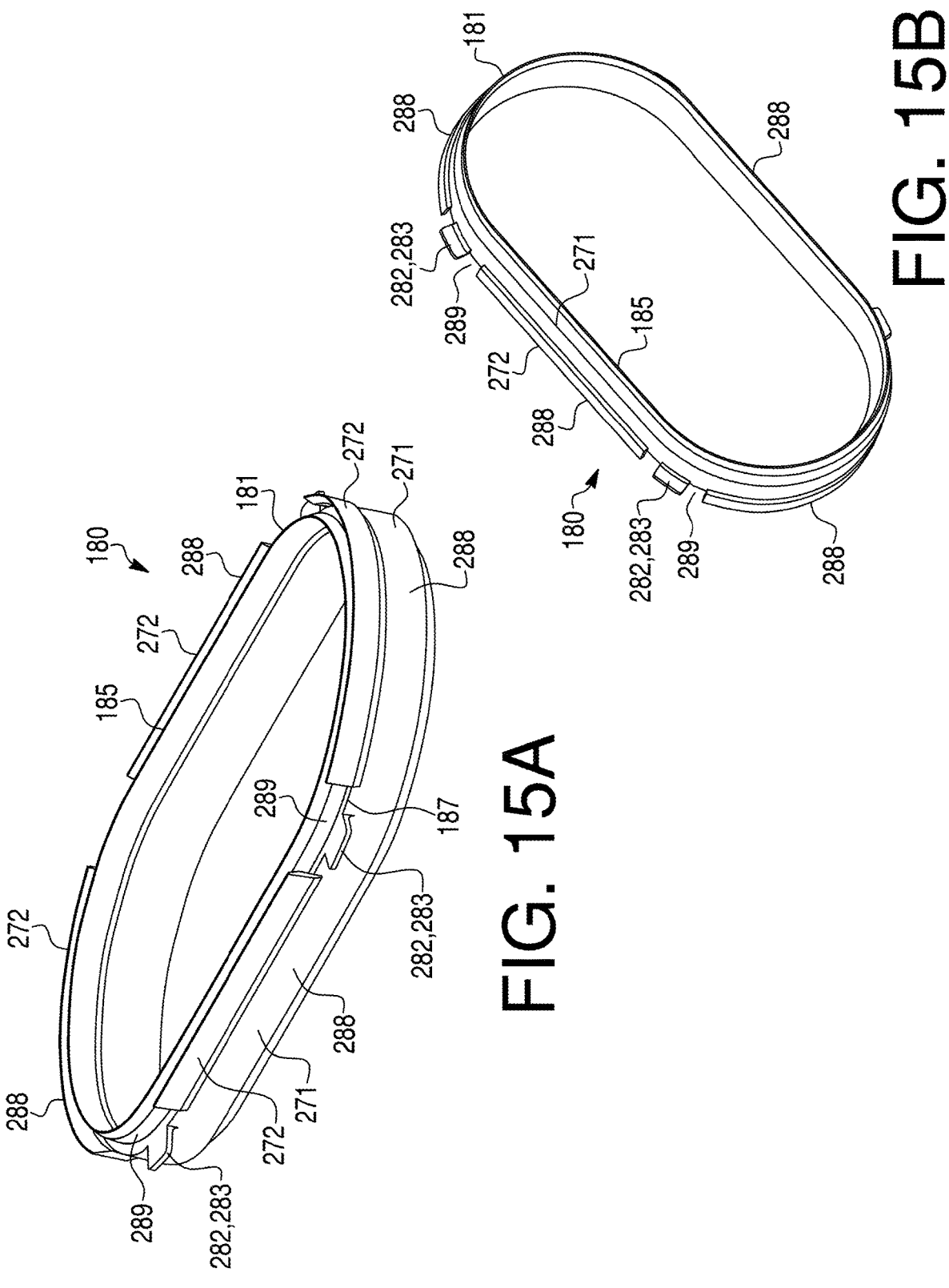
FIGS. 15A-15B are perspective views of a frame of the filter assembly of FIG. 13.

As shown in FIGS. 15A-15B, instead of having the alternating individual inner extensions 188a and the individual outer extensions 188b (as described further herein), the frame body 181 of the frame 180 may include at least one axially-extending positioning or alignment extension, tab, or rib 288 (which may also be referred to as an outer wall) that is the guiding and positioning features of the frame body 181 of the frame 180. The alignment ribs 288 are configured to align the frame 180 to the housing base 120 and/or the housing cover 140.

As shown in FIG. 17, the alignment ribs 288 extend axially from (and axially above and below) the flange 187. In particular, the alignment ribs 288 each include a first portion 271 (that is positioned below the flange 187 and extends axially from one axial side of the flange 187) and a second portion 272 (that is positioned above the flange 187 and extends axially from the other opposite axial side of the flange 187). The first portion 271 and the second portion 272 of the alignment rib 288 may optionally not be axially aligned with each other, but instead may be at least partially axially offset from each other.

The alignment rib 288 may extend around and circumscribe the entire circumferential length or perimeter of the frame body 181 of the frame 180. Alternatively, the frame body 181 of the frame 180 may include a plurality of alignment ribs 288 that together extend around and circumscribe the majority of the perimeter of the frame body 181. At least a portion of each of the alignment ribs 288 (in particular the second portions 272) are circumferentially spaced apart or separated from each other by at least one circumferential gap 289 that corresponds (in size and position) with the at least one fastener 230. The first portions 271 of each of the alignment ribs 288 may extend continuously around the entire circumferential length of perimeter of the frame body 181 (without any gaps). Accordingly, the gaps 289 do not extend axially along the entire axial length of the alignment ribs 288 (but instead extend axially along at least a portion of the length of the second portion 272. The alignment ribs 288 extend along areas of the frame body 181 that do not otherwise correspond to the fasteners 230. Each of the gaps 289 provide an area for a fastener 230 to extend between and clamp the base fastener supporting components 222 and the cover fastening supporting components 242 together. The fastener supporting component 282 is positioned within the gap 289 to align with the base fastener supporting components 222 and the cover fastening supporting components 242.

Each of the alignment ribs 288 extends continuously about the outer perimeter of the frame body 181 at a constant radial position (relative to the inner wall 185) and has a smooth inner surface and a smooth outer surface along the outer perimeter of the frame body 181 (rather than being notched or including any radially inward or outward portions). The alignment ribs 288 are radially spaced apart (outwardly) from the inner wall 185 (along the length of the flange 187) to provide room to receive the gasket arrangement 150 (as described further herein). Additionally, the alignment ribs 288 extend axially substantially parallel to the inner wall 185. Each of the alignment ribs 288 extends circumferentially at a constant radial distance from the inner wall 185 both along its own circumferential length and compared to the other alignment ribs 288.

As shown in FIG. 17, the inner wall 185 extends axially above and below the flange 187. Accordingly, the inner wall 185 includes a first portion (that is positioned below the flange 187 and extends axially from one axial side of the flange 187) and a second portion (that is positioned above the flange 187 and extends axially from the other axial side of the flange 187). The first portion and the second portion of the inner wall 185 may not be axially aligned with each other, but instead may be at least partially axially offset from each other. As further shown in FIG. 17, the axial height of the inner wall 185 (along each axial side of the flange 187) may be approximately equal to or longer than the axial height of the alignment ribs 288 (along one axial side of the flange 187).

As shown in FIG. 14, instead of having the base inner notched portions 128a, the base outer notched portions 128b, cover inner notched portions 148a, and the cover outer notched portions 148b (as described further herein), the base attachment wall 129 of the housing base 120 and the cover attachment wall 149 of the housing cover 140 each extend continuously about the outer perimeter of the housing base 120 and the housing cover 140, respectively, at a constant radial position (relative to the base main wall 125 and the cover main wall 145). The base attachment wall 129 and the cover attachment wall 149 each have a smooth inner surface and a smooth outer surface along the outer perimeter of the housing base 120 and the housing cover 140, respectively (rather than being notched or including any radially inward or outward portions). The housing base 120 and the housing cover 140 may or may not include the base lip 127 and the cover lip 147, respectively. For example, as shown in FIG. 17, the base attachment wall 129 of the housing base 120 is axially aligned with and a part of the base main wall 125. The cover attachment wall 149 of the housing cover 140 is partially axially offset from the cover main wall 145 such that there is a shortened cover lip 147.

Figure 16:
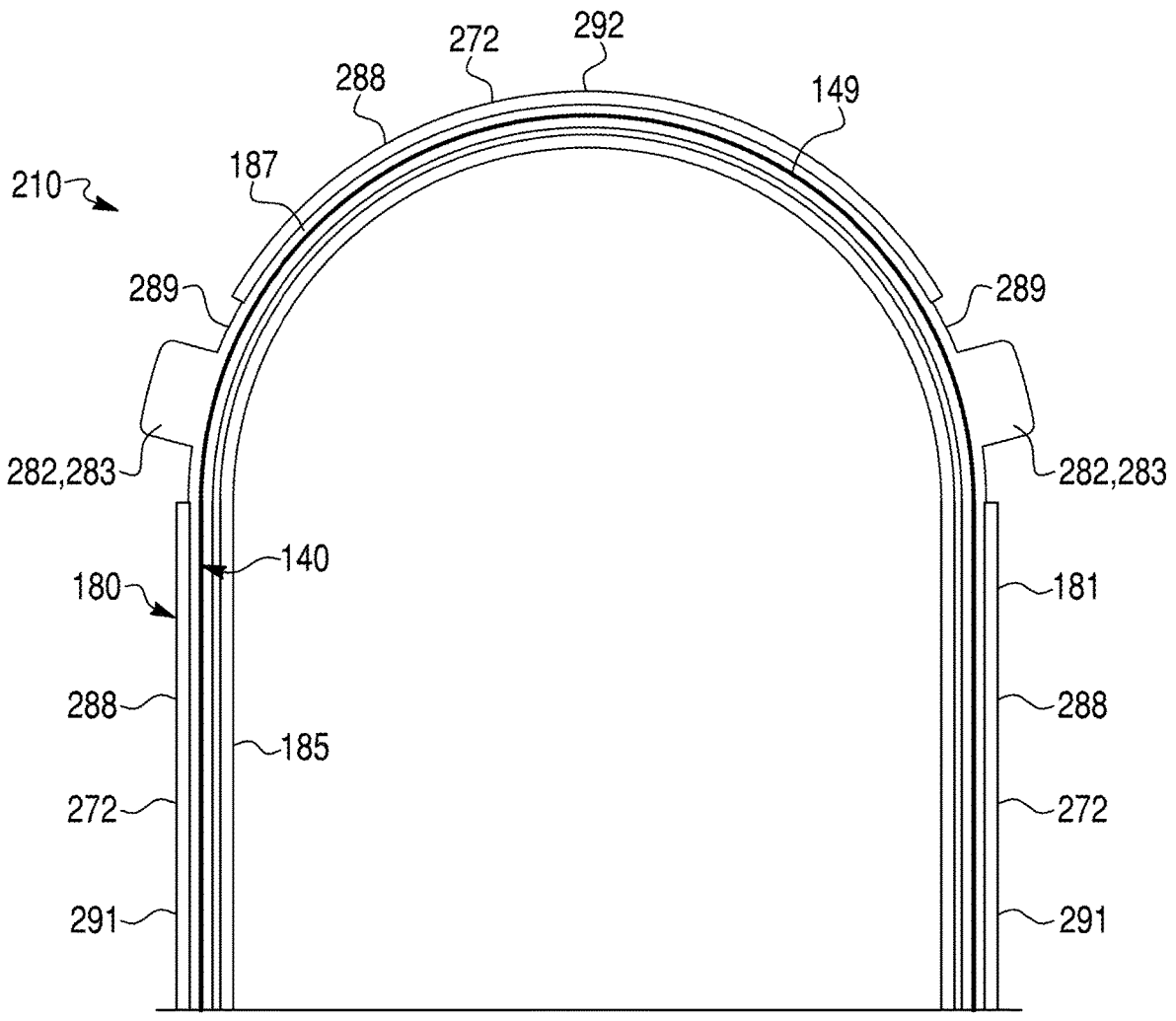
FIG. 16 is a cross-sectional view of a portion of the frame with a portion of the housing assembly of the filter assembly of FIG. 13.

As shown in FIGS. 16-17, when the frame 180 is attached to the housing base 120 and the housing cover 140, the base axial end 126 of the base attachment wall 129 of the housing base 120 and the cover axial end 146 of the cover attachment wall 149 of the housing cover 140 (the base axial end 126 and the cover axial end 146 are shown in FIG. 17) are positioned and contained radially in between the alignment ribs 288 and the inner wall 185. (Although FIG. 16 shows the housing cover 140 attached to the frame 180, the housing base 120 is attached to the frame 180 in the same or a similar manner (along the opposite axial side of the frame 180).) Accordingly, the alignment ribs 288 and the inner wall 185 together prevent the filter assembly 210 from warping by, for example, moving sections of the housing base 120 and the housing cover 140 into the proper position. In particular, the alignment ribs 288 pull and direct the warped housing base 120 and the warped housing cover 140 radially inward and into position, while the inner wall 185 pushes and directs the warped housing base 120 and the warped housing cover 140 radially outward and into position, thereby preventing or reducing warpage in both a radially inward direction and a radially outward direction.

According to one embodiment as shown in FIGS. 15A-15B, the alignment ribs 288 extend at a constant, uniform axial distance or height from the flange 187 along the entire length of the alignment ribs 288 about the circumferential length of perimeter of the flange 187 (and along both axial sides of the flange 187). Furthermore, each of the alignment ribs 288 extend at the same axial height relative to each other. However, according to another embodiment, the axial height of the alignment ribs 288 may vary or slope (i.e., gradually increase or decrease) about the circumferential length or perimeter of the flange 187 such that each of the alignment ribs 288 has a different axial height and/or has different axial heights along their own circumferential length. This configuration allows the filter assembly 210 to be assembled more easily by gradually and smoothly aligning the frame 180 with the housing base 120 and the housing cover 140.

As shown in FIG. 16, the axially shortest portions 291 of the alignment ribs 288 are along the center of the straight or longer sides of the frame body 181 of the frame 180 (which correspond to the areas of the filter assembly 210 that are prone to have the most warpage). The axially longest portions 292 of the alignment ribs 288 are along the center of the circular or rounded ends or the shorter sides of the frame body 181 of the frame 180 (which correspond to the areas of the filter assembly 210 that have low or no warpage). During assembly, the longest portions 292 of the alignment ribs 288 engage with and extend around or along the base attachment wall 129 of the housing base 120 and the cover attachment wall 149 of the housing cover 140 first (along areas with low or no warpage), before the shortest portions 291 of the alignment ribs 288.

As shown in FIG. 17, the frame 180 includes the gasket arrangement 150 (as described further herein). The gasket arrangement 150 is positioned radially between the inner wall 185 and the alignment ribs 288 and axially above and/or below the flange 187. However, instead of extending axially between the flange 187 and the base lip 127 or the cover lip 147 (as described further herein), the gasket arrangement 150 extends between and forms a seal between the flange 187 and the base axial end 126 of the housing base 120 or the housing cover 140 (which may also be positioned radially between the inner wall 185 and the alignment ribs 288). This configuration forms a seal between the base axial end 126 of the housing base 120, the gasket 153, and one axial side of the flange 187 and a seal between the cover axial end 146 of the housing cover 140, the gasket 153, and the other axial side of the flange 187. The axial ends of the housing base 120 and the housing cover 140 may optionally be axially offset from each other.

Each of the various embodiments disclosed herein may have any of the aspects, features, components, benefits, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any processes may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a filter element comprising a filter media and a frame, the frame comprising a plurality of extensions; and
   a housing assembly containing the filter element, the housing assembly comprising a housing base and a housing cover, the housing base comprising a base end portion, the housing cover comprising a cover end portion, wherein at least one of the housing base or the housing cover comprises a plurality of positioning features,
   the frame secured to and surrounding at least an outer perimeter of the filter media, the frame positionable axially between and attachable to the housing base and the housing cover such that the frame engages with the base end portion and the cover end portion and the plurality of positioning features interlocks with the plurality of extensions, and a seal is formed between the frame and the at least one of the housing base or the housing cover, wherein a portion of the plurality of extensions extends axially along at least a portion of an outer perimeter of the at least one of the housing base or the housing cover.

2. The filter assembly of claim 1, wherein an attachment wall of the at least one of the housing base or the housing cover corresponds to and aligns with the plurality of extensions of the frame.

3. The filter assembly of claim 1, wherein a portion of the plurality of extensions extend axially along at least a portion of an inner perimeter of the at least one of the housing base or the housing cover.

4. The filter assembly of claim 2, wherein the plurality of positioning features of the attachment wall includes a first subset of the plurality of positioning features comprising an inner notched portion and a second subset of the plurality of positioning features having an outer notched portion.

5. The filter assembly of claim 1, wherein the plurality of extensions comprises at least one of an axially extending inner extension or an axially extending outer extension such that the at least one of the axially extending inner extension or the axially extending outer extension positioned intermittently along a flange of the frame.

6. The filter assembly of claim 1, wherein the frame comprises at least one alignment rib extending circumferentially around the frame, the at least one alignment rib aligning the frame with the at least one of the housing base or the housing cover.

7. The filter assembly of claim 1, wherein the at least one of the housing base or the housing cover comprises a lip extending radially outward from an axial end of the at least one of the housing base or the housing cover so as to abut an inner wall of the frame.

8. A filter element comprising:
a filter media; and
a frame secured to and surrounding at least an outer perimeter of the filter media, the frame positionable axially between and attachable to a housing base and a housing cover of a housing assembly, the frame comprising:
a flange extending radially and circumferentially about the outer perimeter of the filter media; and
a plurality of extensions positioned along a perimeter of the flange, the plurality of extensions comprising at least one of an axially extending inner extension or an axially extending outer extension, the at least one of an axially extending inner extension or an axially extending outer extension being circumferentially spaced apart, the plurality of extensions aligning the frame to at least one of the housing base or the housing cover such that the frame engages and interlocks with a plurality of positioning features of at least one of a base end portion of the housing base or a cover end portion of the housing cover, the filter media is contained within the housing assembly, and a seal is formed between the frame and the at least one of the housing base or the housing cover.

9. The filter element of claim 8, wherein the plurality of extensions extends axially above and axially below the flange.

10. The filter element of claim 8, wherein the seal is formed by a gasket engaging the frame and the at least one of the housing base or the housing cover, the gasket positioned and extended radially along the flange between inner surfaces of the plurality of extensions.

11. The filter element of claim 10, wherein the gasket comprises a first portion positioned on a first side of the flange and a second portion positioned on a second side of the flange, the first side of the flange opposite to the second side of the flange, the first portion of the gasket configured to form a seal between the frame and the housing base and the second portion of the gasket configured to form a seal between the frame and the housing cover.

12. A filter assembly comprising:
a filter element comprising a filter media and a frame, the frame secured to and surrounding at least an outer perimeter of the filter media; and
a housing assembly containing the filter element, the housing assembly comprising:
a housing base comprising a base end portion;
a housing cover comprising a housing end portion;
a fastener comprising a first axial end and a second axial end; and
a fastener supporting component coupled to the at least one of the housing base or the housing cover, the fastener supporting component comprising an attachment tab extending radially from an outer surface of the at least one of the housing base or the housing cover, the attachment tab comprising a notch receiving at least one of the first axial end or the second axial end of the fastener so as to secure the fastener to the attachment tab;
wherein the frame is positionable axially between and attachable to the housing base and the housing cover such that the notch receives and secures the fastener.

13. The filter assembly of claim 12 further comprising a frame fastener supporting component, the frame fastener supporting component comprising a support tab extending radially outward from an outer surface of the frame, the support tab axially supporting the attachment tab when the frame, the housing base, and the housing cover are coupled together.

14. The filter assembly of claim 12,
wherein the fastener supporting component comprises a fastening support arm extending radially outward on the outer surface of the at least one of the housing base or the housing cover, the fastening support arm comprising the notch, at least one of the first axial end or the second axial end of the fastener securing within the notch so as to facilitate rotation of the fastener.

15. The filter assembly of claim 12 wherein the housing base comprises a base fluid port and the housing cover comprises a cover fluid port, the base fluid port and the cover fluid port facilitating flow of fluid to and from the filter assembly.

* * * * *